United States Patent
Ohbuchi et al.

(10) Patent No.: US 9,629,099 B2
(45) Date of Patent: *Apr. 18, 2017

(54) RADIO COMMUNICATION APPARATUS AND TRANSMISSION POWER CONTROL METHOD

(71) Applicant: Panasonic Intellectual Property Management Co., Ltd., Osaka (JP)

(72) Inventors: Ken Ohbuchi, Fukuoka (JP); Takashi Yamamoto, Fukuoka (JP); Kouji Yoshida, Fukuoka (JP); Takashi Terada, Fukuoka (JP); Shinji Fukuda, Fukuoka (JP); Katsumi Nakagawa, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 75 days.

This patent is subject to a terminal disclaimer.

(21) Appl. No.: 14/162,369

(22) Filed: Jan. 23, 2014

(65) Prior Publication Data
US 2014/0206409 A1    Jul. 24, 2014

(30) Foreign Application Priority Data

Jan. 24, 2013 (JP) ................... 2013-010910
Jan. 29, 2013 (JP) ................... 2013-014208
Jun. 17, 2013 (JP) ................... 2013-126583

(51) Int. Cl.
*H04W 52/22* (2009.01)
*H04M 1/725* (2006.01)
(Continued)

(52) U.S. Cl.
CPC ......... *H04W 52/226* (2013.01); *H04W 52/16* (2013.01); *H04W 52/242* (2013.01); *H04W 52/245* (2013.01); *H04W 52/325* (2013.01)

(58) Field of Classification Search
CPC .... H04B 2203/5495; H04B 3/54; H04B 3/58; H04W 52/0229; H04W 52/0241; H04W 52/48
See application file for complete search history.

(56) References Cited

U.S. PATENT DOCUMENTS 5,386,589 A    1/1995 Kanai
5,978,657 A *  11/1999 Suzuki ................. H04W 52/24
                                                        455/522
(Continued)

FOREIGN PATENT DOCUMENTS

JP        05244056 A     9/1993
JP     2001332987 A    11/2001
(Continued)

*Primary Examiner* — Bobbak Safaipour
(74) *Attorney, Agent, or Firm* — Seed IP Law Group LLP

(57) ABSTRACT

A radio communication apparatus and transmission power control method are disclosed, which can maintain communication with handsets while avoiding an increase in radio interference to another radio communication system as much as possible when radio communication is performed with one or more handsets. The handset transmits a communication start request signal to a base unit. Upon verifying the reception of the communication start request, the base unit measures the RSSI level of the communication start request signal transmitted from the handset, determines a transmission power value based on a power control table that has been updated with the measured RSSI level, and controls the transmission power of a control signal transmitted to the handset.

21 Claims, 31 Drawing Sheets

(51) Int. Cl.
*H04W 52/24* (2009.01)
*H04W 52/16* (2009.01)
*H04W 52/32* (2009.01)

(56) References Cited

U.S. PATENT DOCUMENTS

| | | | | |
|---|---|---|---|---|
| 6,963,753 | B1 * | 11/2005 | Hamabe | H04B 7/022 370/278 |
| 6,983,164 | B2 | 1/2006 | Kajimura | |
| 7,023,321 | B2 * | 4/2006 | Brillon | G07C 9/00309 180/287 |
| 8,014,808 | B2 * | 9/2011 | Ishii | H04W 52/322 455/127.1 |
| 8,626,216 | B2 * | 1/2014 | Higuchi | H04B 1/707 455/450 |
| 9,516,399 | B2 * | 12/2016 | Ohbuchi | H04R 1/08 |
| 2001/0012276 | A1 * | 8/2001 | Tsunehara | H04W 52/245 370/318 |
| 2001/0023189 | A1 | 9/2001 | Kajimura | |
| 2002/0193115 | A1 * | 12/2002 | Furukawa | H04W 52/245 455/442 |
| 2005/0054302 | A1 * | 3/2005 | Hanaoka | H04L 1/0003 455/67.16 |
| 2007/0265757 | A1 * | 11/2007 | Kawasaki | H04W 52/04 701/51 |
| 2008/0130596 | A1 * | 6/2008 | Kalhan | H04W 88/10 370/338 |
| 2008/0130598 | A1 * | 6/2008 | Kalhan | H04W 64/00 370/338 |
| 2008/0182584 | A1 * | 7/2008 | Le | H04W 16/20 455/446 |
| 2010/0067436 | A1 * | 3/2010 | Kouda | H04W 24/02 370/328 |
| 2010/0098019 | A1 * | 4/2010 | Kim | H04L 1/1607 370/330 |
| 2010/0254326 | A1 * | 10/2010 | Sawahashi | H04B 7/02 370/329 |
| 2012/0147777 | A1 * | 6/2012 | Arashin | H04W 72/02 370/252 |
| 2013/0045772 | A1 * | 2/2013 | Ohyama | H04W 52/56 455/522 |
| 2013/0219519 | A1 * | 8/2013 | Russello | G06F 21/6218 726/29 |
| 2013/0275642 | A1 * | 10/2013 | Teltz | G06F 1/1632 710/303 |
| 2013/0324039 | A1 * | 12/2013 | Horiguchi | H04B 5/0031 455/41.1 |
| 2014/0029525 | A1 * | 1/2014 | Saitoh | H04W 52/241 370/329 |
| 2014/0330998 | A1 * | 11/2014 | Dees | H04M 1/72527 710/303 |
| 2015/0063604 | A1 * | 3/2015 | Ohbuchi | H04R 1/08 381/122 |

FOREIGN PATENT DOCUMENTS

| | | |
|---|---|---|
| JP | 2002345026 A | 11/2002 |
| JP | 2014-140122 A | 7/2014 |
| JP | 2014-143578 A | 8/2014 |
| JP | 2014-143579 A | 8/2014 |
| JP | 2014-143580 A | 8/2014 |
| JP | 2014-146959 A | 8/2014 |
| JP | 2014-146960 A | 8/2014 |
| JP | 2014-154976 A | 8/2014 |

* cited by examiner

| HANDSET ID NUMBER | RSSI LEVEL | RECEPTION TIME |
|---|---|---|
| ID1 | Ppp1 | Tpp1 |
| ID2 | Ppp2 | Tpp2 |
| ID3 | Ppp3 | Tpp3 |
| ... | ... | ... |
| IDn | Pppn | Tppn |

*FIG. 6*

| HANDSET ID NUMBER | RSSI LEVEL | RECEPTION TIME |
|---|---|---|
| ID 1 | Ppp1 | Tpp1 |
| ID 2 | Ppp2 | Tpp2 |
| ID 3 | | |
| ... | ... | ... |
| ID n | Pppn | Tppn |

FIG. 27

RADIO COMMUNICATION APPARATUS AND TRANSMISSION POWER CONTROL METHOD

CROSS REFERENCE TO RELATED APPLICATIONS

This application is entitled to the benefit of Japanese Patent Applications No. 2013-010910 filed on Jan. 24, 2013, No. 2013-014208 filed on Jan. 29, 2013 and No. 2013-126583 filed on Jun. 17, 2013, the disclosures of which including the specifications, drawings and abstracts are incorporated herein by reference in their entirety.

TECHNICAL FIELD

The present invention relates to a radio communication apparatus and a transmission power control method applicable to a digital cordless telephone.

BACKGROUND ART

Cordless telephones having a cordless handset and enabling a conversation with a person at a distance from a base unit connected to a telephone line are widely used. With this widespread use, situations where a plurality of radio communication systems exist in the same area have arisen. If the base unit always transmits a radio signal with the maximum power in such situations, although communication is made possible between the base unit and the handset at a distance from one another, there arises a problem in that the radio used for the communication causes significant interference to other radio communication systems.

Given this, cordless telephones variably controlling the transmission power of the base unit have been developed. For example, Japanese Patent Application Laid-Open No. 2001-332987 (hereinafter, referred to as "PTL 1") discloses a technique that sets the optimum transmission power by making a control such that the transmission power value of a radio communication apparatus is made the maximum value at the start of communication and the transmission power value is reduced by a predetermined amount each time transmission succeeds and increased by a predetermined amount when transmission fails, for example.

Japanese Patent Application Laid-Open No. 2002-345026 (hereinafter, referred to as "PTL 2") discloses a technique that controls the transmission power of the base unit (connection apparatus) in accordance with whether or not a handset is linked to a charging cradle. That is, PTL 2 discloses the technique whereby communication is done with a low transmission power when the handset is linked to the charging cradle and communication is done with a high transmission power when the handset is removed from the charging cradle. By doing this, the technique of PTL 2 enables maintenance of communication between a handset and a connection apparatus even if an interfering signal is received in the process of the handset moving away from the connection apparatus.

CITATION LIST

Patent Literature

PTL 1
Japanese Patent Application Laid-Open No. 2001-332987
PTL 2
Japanese Patent Application Laid-Open No. 2002-345026

SUMMARY OF INVENTION

Technical Problem

However, PTL 1 is the technique for controlling the power between the handset and the base unit to be low during a call (or during other data communication), and is not directed to power control of the control channel for synchronization and control signal transmission between the base unit and a handset except for during a call. Also, PTL 2 is an invention related to a control between one handset and a base unit, and cannot be practiced when a plurality of handsets exist. Additionally, the above-noted related art does not consider interference by a control channel signal with respect to another cordless telephone system.

FIG. 1 shows how interference with respect to another nearby cordless telephone system occurs. As shown in FIG. 1, if there are a plurality of handsets (handsets A and B) registered to a base unit, and if the power on the control channel on which the base unit is transmitting is made maximum to enable reception at the distant handset B, there is a risk of great interference with respect to another nearby cordless telephone system.

PTL 2 describes a connection apparatus making the transmission power low when one handset having the same terminal number as the connection apparatus is linked to a charging cradle, but does not disclose anything about transmission power control of a control signal when a plurality of handsets having the same terminal number as the connection apparatus exist. For example, if the base unit reduces the transmission power of the control signal when a nearby handset is placed into a charging cradle, there is a risk that communication between a distant handset and the base unit will be cut off.

An object of the present invention is to provide a radio communication apparatus and transmission power control method that can maintain communication with all the handsets while avoiding an increase in radio interference to another radio communication system as much as possible when radio communication is performed with one or a plurality of handsets.

Solution to Problem

A radio communication apparatus according to an aspect of the present invention is a radio communication apparatus that performs radio communication with a handset, using a TDMA system, the apparatus including: a level measurement section that measures a reception level of a predetermined signal transmitted from the handset; and a transmission power control section that performs transmission power control so as to determine a transmission power value in accordance with a minimum value of the reception level and to transmit a control signal to the handset, using a control channel and the determined transmission power control value.

A radio communication apparatus according to an aspect of the present invention includes: a level measurement section that measures a reception level of a communication start request signal indicating a request to start communication or a communication end request signal indicating a request to end communication transmitted from one or more handsets; a storage section that stores the reception level for each of the handsets; and a transmission power control section that performs transmission power control so as to determine a transmission power value in accordance with a minimum value of the stored reception level and to transmit a control signal to the one or more handsets, using the determined transmission power control value.

A transmission power control method according to an aspect of the present invention is a transmission power control method of a radio communication apparatus that performs radio communication with a handset, using a TDMA system, the method including: measuring a reception level of a predetermined signal transmitted from the handset; and performing transmission power control so as to determine a transmission power value in accordance with a minimum value of the reception level and to transmit a control signal to the handset, using a control channel and the determined transmission power control value.

A radio communication method according to an aspect of the present invention includes: measuring a reception level of a communication start request signal indicating a request to start communication or a communication end request signal indicating a request to end communication transmitted from one or more handsets; storing the reception level for each of the handsets; and performing transmission power control so as to determine a transmission power value in accordance with a minimum value of the stored reception level and to transmit a control signal to the one or more handsets, using the determined transmission power control value.

Advantageous Effects of Invention

According to the present invention, it is possible to maintain communication with a plurality of handsets while the received signal level at the handsets is maintained to the extent sufficient to maintain communication, and an increase in radio interference to another radio communication system is avoided as much as possible during radio communication with one or a plurality of handsets.

BRIEF DESCRIPTION OF DRAWINGS

FIG. 6 is a drawing showing information stored in a memory section of a base unit according to an embodiment of the present invention;

FIG. 27 is a drawing showing information stored in a memory section of a base unit according to an embodiment of the present invention;

DESCRIPTION OF EMBODIMENTS

Embodiments of the present invention will be described in detail below with references made to the drawings. In the following, a digital cordless telephone conforming to the DECT (Digital Enhanced Cordless Telecommunication) standard is described as an example. DECT is a system that has been established as a standard by ETSI (European Telecommunications Standards Institute), which is a telecommunications standardization organization in Europe.

(Embodiment 1)

A digital cordless telephone includes one base unit (refer to FIG. 2), a plurality handsets 2 (refer to FIG. 3), and the same number of charging cradles 3 (refer to FIG. 3) as that of handsets 2. Base unit 1 (radio communication apparatus)

performs radio communication with each handsets 2 by the TDMA (time division multiple access) system.

Figure 1:
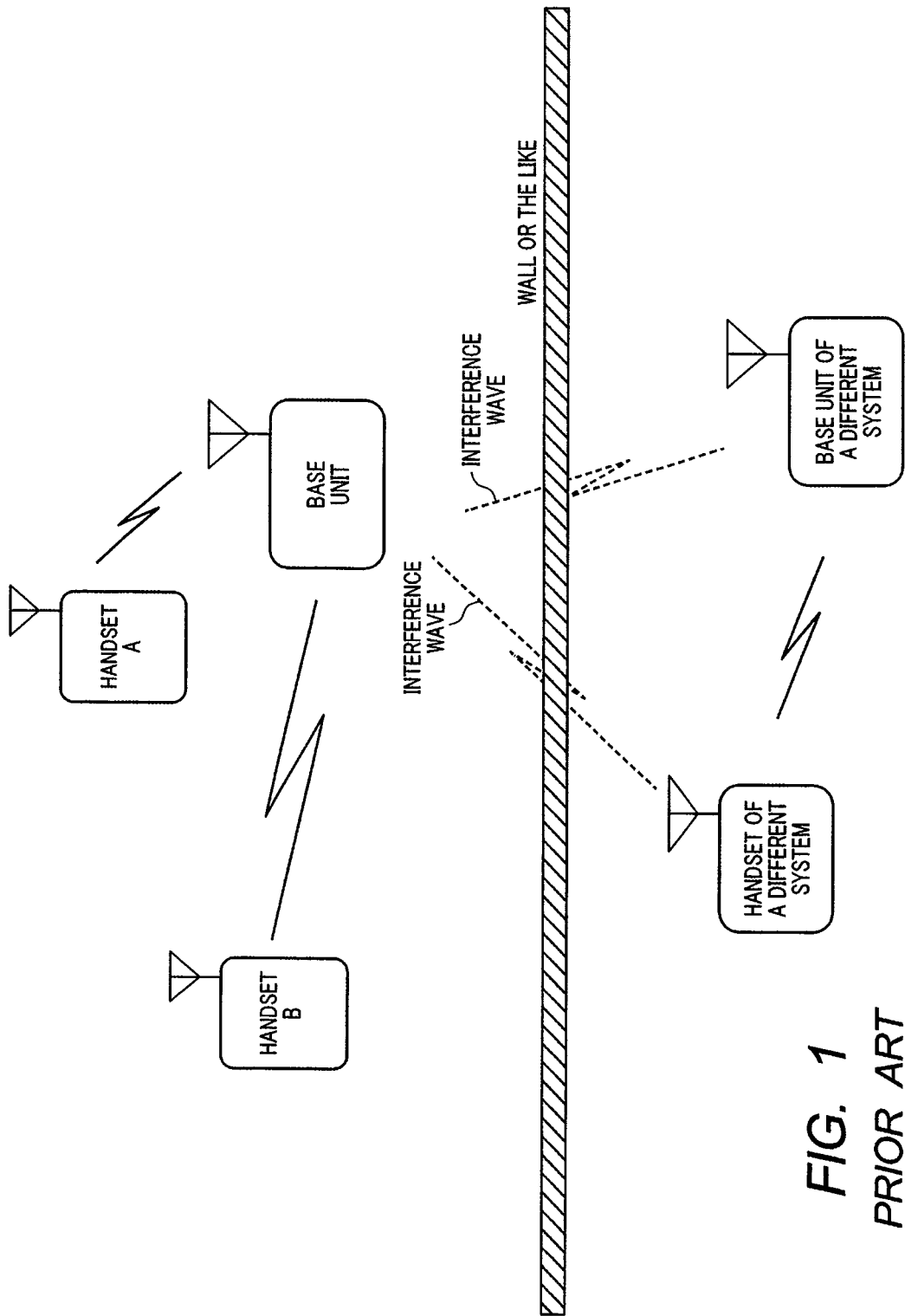
FIG. 1 is a drawing showing how interference with respect to another nearby cordless telephone system occurs.
Figure 2:
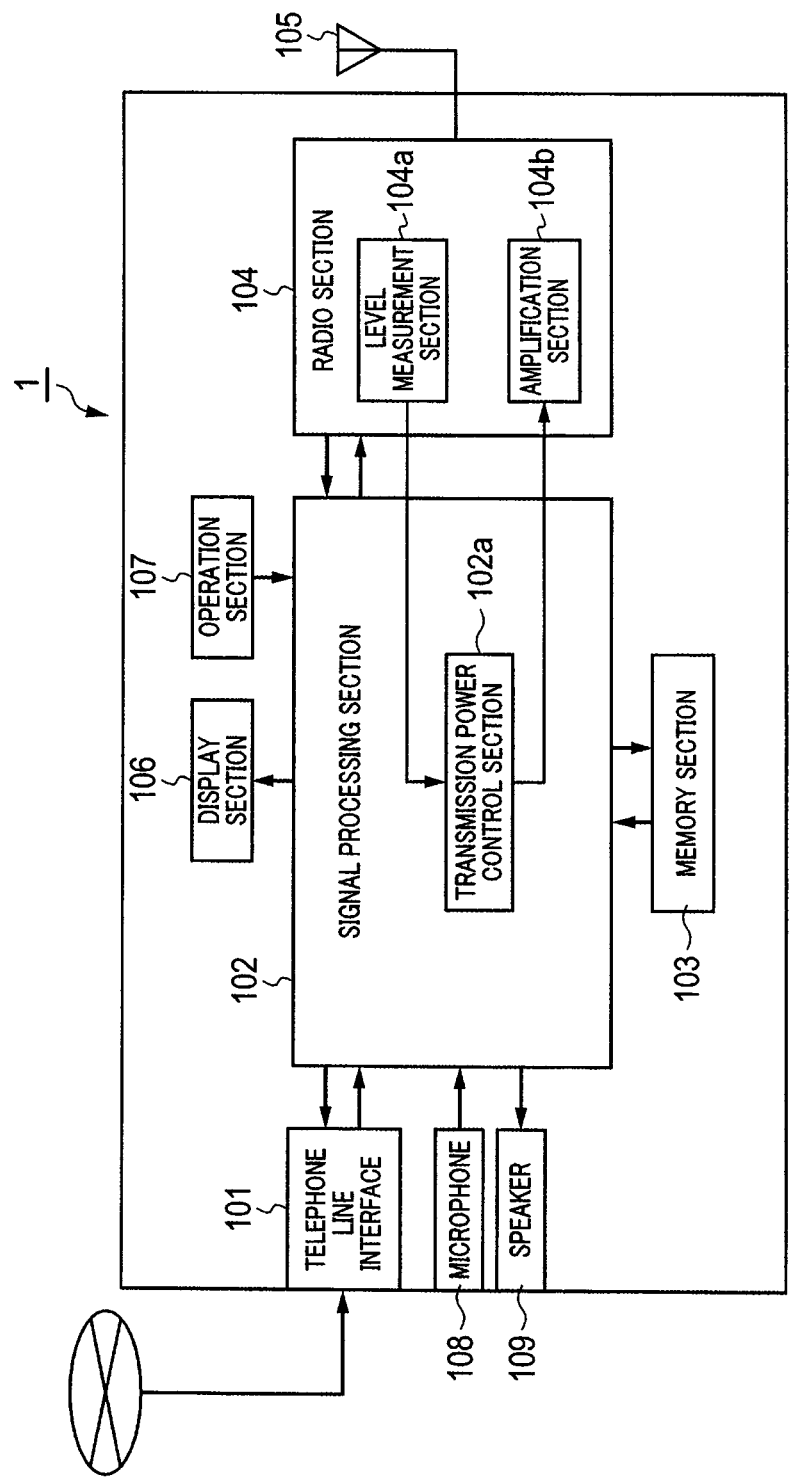
FIG. 2 is a block diagram showing the configuration of a base unit according to an embodiment of the present invention.

FIG. 2 is a block diagram showing the configuration of base unit 1 according to an embodiment of the present invention. As shown in FIG. 2, base unit 1 mainly includes telephone line interface 101, signal processing section 102, memory section 103, radio section 104, antenna 105, display section 106, operation section 107, microphone 108, and speaker 109.

Telephone line interface 101 is an interface for connecting a telephone line with signal processing section 102, performs incoming call-receiving processing and call originating processing to connect to an outside telephone via a telephone line, and performs release and closing of the line.

Signal processing section 102, based on a control program stored in memory section 103, processes signals output from various sections and controls various sections. In particular, signal processing section 102 encodes digital voice data by the ADPCM (adaptive differential pulse code modulation) system, adds control data thereto, inserts it into a predetermined slot within a frame, performs modulation processing such as frequency modulation, and generates a baseband transmitted signal. Signal processing section 102 demodulates the received baseband signal, extracts control data and encoded voice data from a predetermined slot within the frame, decodes the encoded voice data by the ADPCM system, and generates digital voice data.

Memory section 103 stores predetermined information, such as a control program and IDs (identifications) of handsets. Of the information stored in memory section 103, the parts that are related to the present invention will be described later.

Radio section 104 amplifies and performs radio processing such as up-conversion with respect to the baseband digital signal output from signal processing section 102, and transmits a radio signal from antenna 105. Radio section 104 also amplifies and performs radio processing such as down-conversion of a radio signal received at antenna 105 and outputs a baseband digital signal to signal processing section 102.

Display section (LCD: liquid crystal display) 106 displays various information output from signal processing section 102. Operation section 107 has various buttons, dials, and keys and converts operations based on a user's intention to electrical signals, and outputs the signals to signal processing section 102.

Microphone 108 collects sounds from a user's voice, converts these to a voice signal, and outputs the signal to signal processing section 102. Speaker 109 converts the voice signal output from signal processing section 102 to a voice and outputs the voice.

In this case, a feature of the present invention is that signal processing section 102 includes transmission power control section 102*a*. Additionally, radio section 104 includes level measurement section 104*a* and amplification section 104*b*.

Transmission power control section 102*a* calculates the transmission power based on the RSSI (received signal strength indicator) level of the received signal from each handset 2 measured by level measurement section 104*a* and outputs a control signal indicating the calculation result to amplification section 104*b*. The specific transmission power control method in transmission power control section 102*a* will be described later.

Level measurement section 104*a* measures the RSSI level of the received signal from each handset 2 and outputs an RSSI signal indicating the measurement result to transmission power control section 102*a*.

Amplification section 104*b*, amplifies the power of the radio signal transmitted from antenna 105, based on control by transmission power control section 102*a*.

Figure 3:
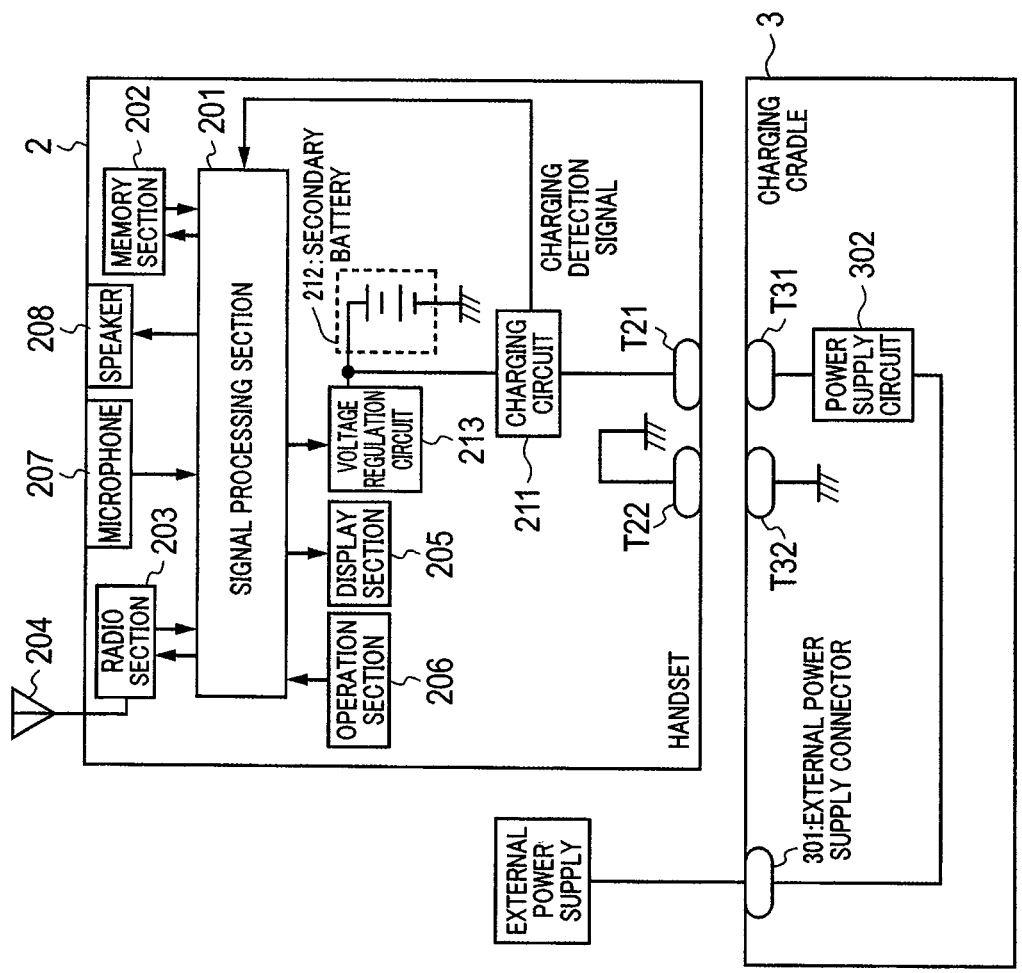
FIG. 3 is a block diagram showing the configuration of a handset and a charging cradle according to an embodiment of the present invention.

FIG. 3 is a block diagram showing the configuration of handset 2 and charging cradle 3 according to an embodiment of the present invention. As shown in FIG. 3, handset 2 mainly includes signal processing section 201, memory section 202, radio section 203, antenna 204, display section 205, operation section 206, microphone 207, speaker 208, charging circuit 211, secondary battery 212, and voltage regulation circuit 213. Handset 2 also has terminals T21 and T22.

Signal processing section 201 of handset 2, based on a control program stored in memory section 202, processes signals output from various sections and controls various sections. Upon receiving a charging detection signal from charging circuit 211, signal processing section 201 transmits to base unit 1, via radio section 203 and antenna 204, a notification signal for notification that handset 2 has been placed into charging cradle 3 (hereinafter referred to as the "placement notification signal").

When the charging detection signal that has been output from charging circuit 211 stops, signal processing section 201 transmits to base unit 1, via radio section 203 and antenna 204, a notification signal for notification that handset 2 has been removed from charging cradle 3 (hereinafter referred to as the "removal notification signal").

Memory section 202 stores predetermined information such as a control program.

Radio section 203 performs radio processing such as amplification and up-conversion of the baseband digital signal output from signal processing section 201 and transmits a radio signal from antenna 204. Radio section 203 also performs radio processing such as amplification and down-conversion of the radio signal received at the antenna 204 and outputs a baseband digital signal to signal processing section 201.

Display section 205 displays various information output from signal processing section 201. Operation section 206 has various buttons, dials, and keys, and converts operations based on a user's intention to electrical signals, and outputs them to signal processing section 201.

Microphone 207 collects sounds from a user's voice, converts these to a voice signal, and outputs the signal to signal processing section 201. Speaker 208 converts the voice signal output from signal processing section 201 to a voice and outputs the voice.

Terminals T21 and T22 are for inputting a charging current by making contact with terminals T31 and T32 when handset 2 is placed into charging cradle 3.

Charging circuit 211 receives, as input, a charging current supplied from charging cradle 3 and supplies the current to secondary battery 212 and voltage regulation circuit 213. When handset 2 is placed into charging cradle 3 and a charging current from charging cradle 3 is detected, charging circuit 211 outputs a charging detection signal to signal processing section 201. When handset 2 is removed from charging cradle 3 in which handset 2 had been placed and the charging current is no longer detected from charging cradle 3, charging circuit 211 stops outputting the charging detection signal.

Secondary battery 212 accumulates the charging current from charging circuit 211 and discharges into voltage regulation circuit 213.

Voltage regulation circuit 213 is a voltage-regulated source supplying a stabilized DC voltage to signal processing section 201, and converts a DC voltage from charging circuit 211 or secondary battery 212 (for example, 2.5 V) to a lower voltage (for example, 1.8 V).

Charging cradle 3 mainly includes external power supply connector 301 and power supply circuit 302, and also includes terminals T31 and T32.

Terminals T31 and T32 are for supplying a charging current to handset 2.

External power supply connector 301 connects to an external power supply and receives a DC current as input.

Power supply circuit 302 is a DC/DC converter that converts DC voltage from external power supply connector 301 (for example, 6.5 V) to an appropriate voltage (for example, 2.5 V) and supplies the voltage to charging circuit 211 of handset 2.

Figure 4:
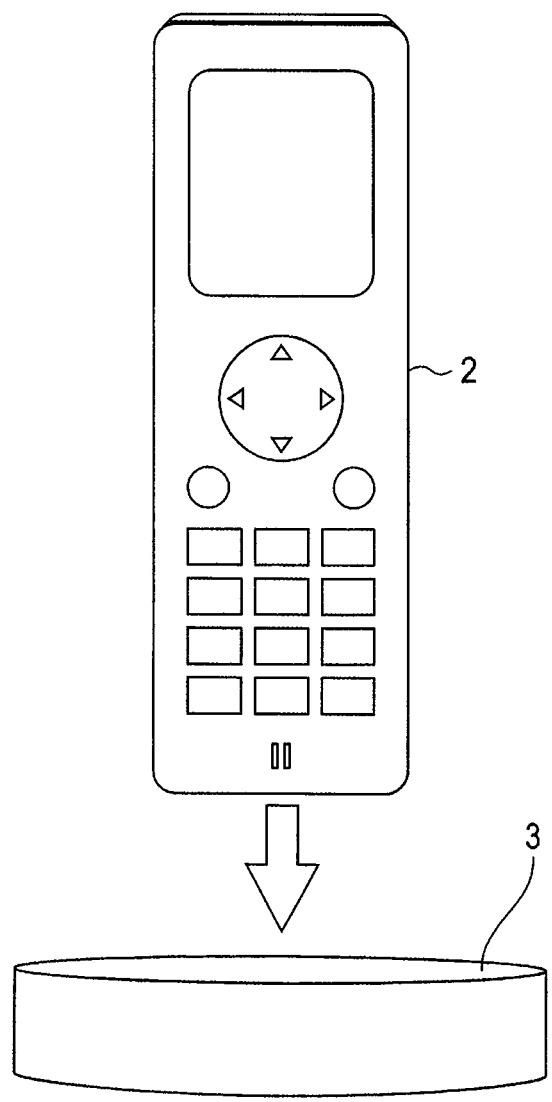
FIG. 4 is an outer view illustrating how a handset rests in a charging cradle according to an embodiment of the present invention.

Handset 2 is configured to enable easy placement into and removal from charging cradle 3 as shown in FIG. 4. When handset 2 is placed into charging cradle 3, it is electrically connected to charging cradle 3, and a charging current from charging cradle 3 is accumulated in secondary battery 212. There are base units 1 configured to enable charging of handset 2. In case of such base unit 1, when being placed into the charging part of base unit 1, handset 2 is electrically connected to the charging part of base unit 1, and a charging current from base unit 1 is accumulated in secondary battery 212.

Next, communication between a base unit and a handset in the standby state in the DECT system will be described using FIG. 5A and FIG. 5B.

Figure 5A:
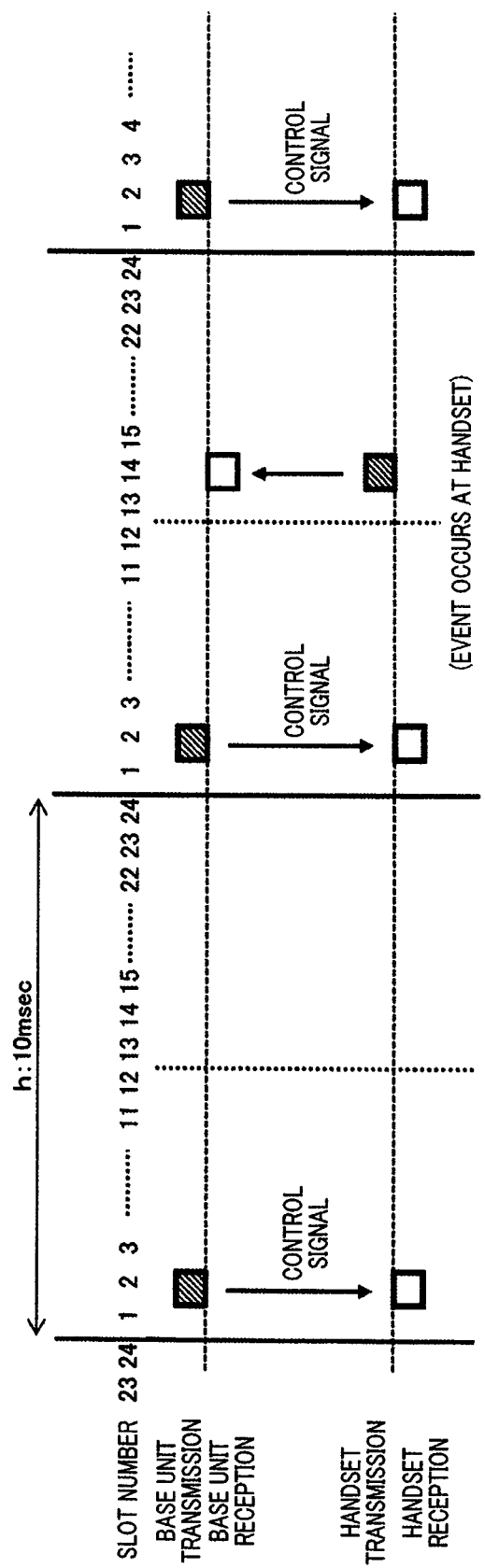
FIG. 5A is a drawing describing how communication is performed between the base unit and a handset in the standby state in the DECT system.
Figure 5B:
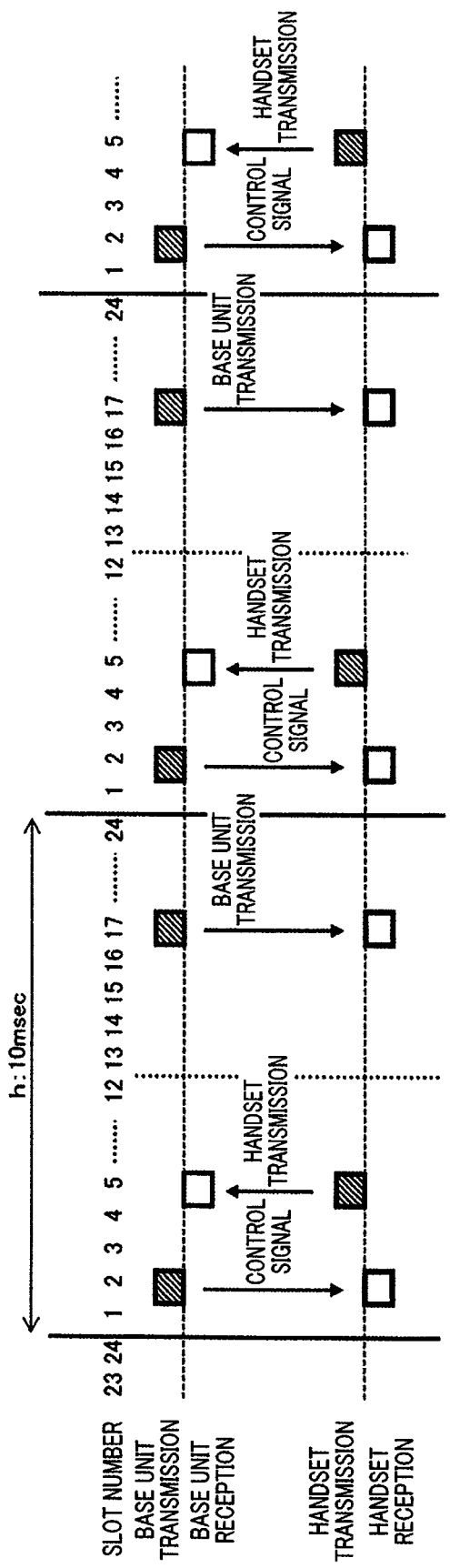
FIG. 5B is a drawing describing how communication is performed between the base unit and a handset in the call-in-progress state in the DECT system.

As shown in FIG. 5A and FIG. 5B, the DECT system adopts a TDMA/TDD (time division multiple access/time division duplex) system including 24 slots (12 slots for the uplink and 12 slots for the downlink) in one frame with a period of 10 ms. At least one slot is provided as a control channel slot, and the control channel and calling channels are both transmitted and received with a frame period of 10 ms.

The base unit determines a predetermined slot that is pre-determined as a control channel with respect to a handset for each frame (the 2nd slot in FIG. 5A and FIG. 5B), and transmits a control signal (beacon) on this channel.

As shown in FIG. 5A, in the standby state a signal is not transmitted from the handset to the base unit. If an event such as the handset being placed into a charging cradle occurs, the handset transmits to the base unit a notification signal in a pre-determined predetermined slot (14th slot in FIG. 5A).

Next, communication between the base unit and a handset in the call-in-progress state in the DECT system is shown in FIG. 5B. In the call-in-progress state, the base unit transmits a control signal (beacon) in the same manner as in the standby state. The base unit and the handset each transmit a voice signal in each frame, in slots that have been specified by the base unit (5th and 17th in respective slots in FIG. 5B).

Base unit 1 in the present embodiment measures the RSSI level of a notification signal (such as the placement notification signal or the removal notification signal) transmitted from each handset 2 and controls the transmission power based on the measurement result.

Next, the information stored in memory section 103 of base unit 1 will be described using FIG. 6. As shown in FIG. 6, for each handset 2, memory section 103 of base unit 1 stores, in association with one another, the ID number ($ID_i$) of the handset, the measured RSSI level ($Ppp_i$) of the notification signal (such as the placement notification signal or the removal notification signal), and the time ($Tpp_i$) of receiving the notification signal. In the following, the table shown in FIG. 6 will be called the power control table.

Each time a notification signal is received by base unit 1 from each handset 2, level measurement section 104a measures the RSSI level of the notification signal and outputs the measurement result to signal processing section 102 (transmission power control section 102a).

Upon receiving a notification signal from any handset 2, signal processing section 102 stores the ID of the handset 2, the RSSI level, and the time of reception, in association with one another into memory section 103.

Next, the transmission power control method when the base unit according to the present embodiment transmits a control signal on the control channel will be described.

At a predetermined timing, transmission power control section 102a calculates the transmission power value, using a minimum value of RSSI level ($Ppp_i$) stored in memory section 103. The timing of transmission power control section 102a performing transmission power control can be, for example, the timing at which the contents stored in memory section 103 shown in FIG. 6 are updated.

Specifically, transmission power control section 102a reads each RSSI level ($Ppp_i$) stored in memory section 103 when the notification signal transmitted from each handset 2 is received and selects the minimum value from among the RSSI levels. The transmission power value of each handset 2 that allows for communication with base unit 1 is set to the same value. Base unit 1 may know the transmission power value of each handset 2 beforehand. Additionally, at the time of a registration operation, each handset 2 may notify base unit 1 of its transmission power value. The transmission power value of each handset 2 is stored beforehand into memory section 103 of base unit 1 when the product is manufactured.

In the present embodiment, the amplification of amplification section 104b when a control signal is transmitted is controlled to suit the handset 2 for which the received signal level is the weakest. Specifically, from information stored in memory section 103, base unit 1 reads out the RSSI level (minimum RSSI level) of handset 2 having the weakest received signal level and subtracts the minimum RSSI level ($Ppp_i$) from a known value of handset transmission power, so as to calculate the propagation path loss related to handset 2 having the weakest received signal level. In a cordless telephone in which base unit 1 and handset 2 transmit with the same transmission power, the propagation path loss up to handset 2 can be calculated using the transmission power of base unit 1 itself rather than the transmission power of handset 2.

Transmission power control section 102a calculates the transmission power value for transmission of a control signal by base unit 1 in accordance with a value that is the sum of the propagation path loss related to handset 2 with the weakest level and a received power reference value. The received power reference value is the received power value required to maintain communication between base unit 1 and handset 2 and to avoid an increase in communication interference, to which a margin is added. For example, in a case where the RSSI level ($Ppp_i$) of the signal received from one handset 2 falls below the received power reference value when it is recognized that all handsets 2 are placed in their charging cradles 3, base unit 1 may stop the transmission power control and transmit the control signal with full power.

Transmission power control section 102a then controls amplification section 104b so that the signal is transmitted with the calculated transmission power value.

Figure 7A:
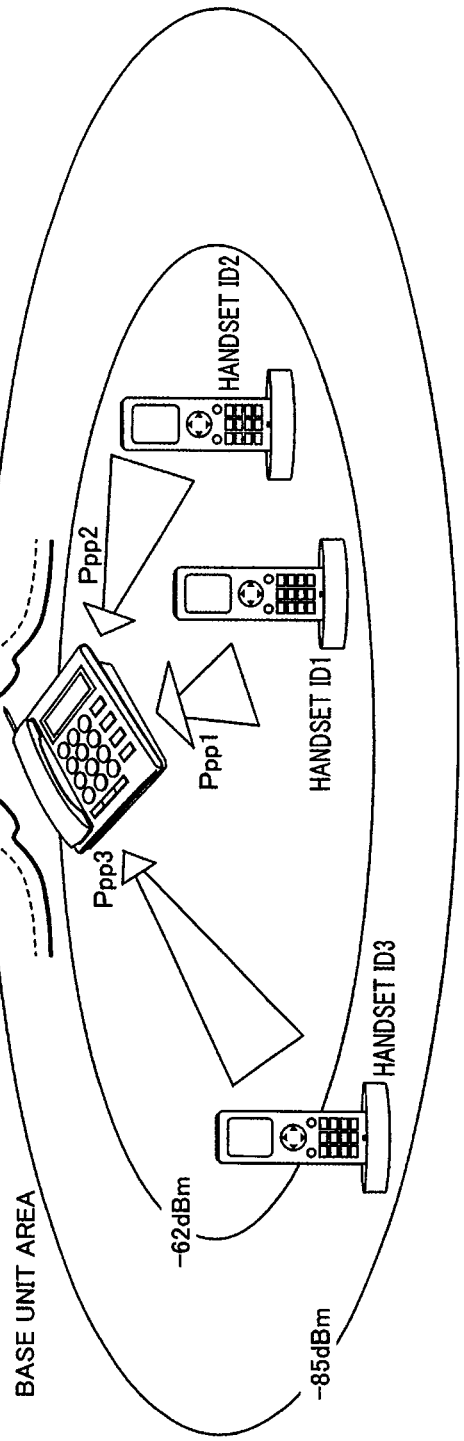
FIG. 7A and FIG. 7B are drawings showing how area adjustment of the control channel of the base unit according to an embodiment of the present invention is performed.
Figure 7B:
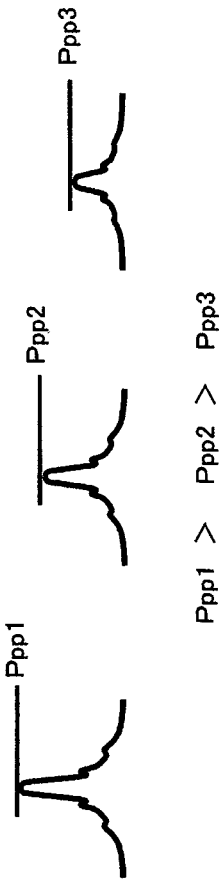

FIG. 7A and FIG. 7B show how the signal footprint is adjusted when the base unit transmits a control signal on a control channel in the present embodiment. Let us consider a case where the RSSI levels at the base unit of the notification signals transmitted by handsets with ID1, ID2, and ID3 are taken to be, respectively, $Ppp_1$, $Ppp_2$, and $Ppp_3$. In this case, if the RSSI levels of the notification signals of the handsets (ID1, ID2, and ID3) at the base unit are such that $Ppp_1 > Ppp_2 > Ppp_3$, the base unit calculates the transmission power value using the minimum value $Ppp_3$.

Doing this enables reception of a control signal transmitted from base unit 1 on a control channel at even a handset at a distance from the base unit 1 and having a large propagation path loss, with a received power value required for maintaining communication. Because the transmission power of base unit 1 is reduced, it is also possible to avoid an increase in radio interference to another radio communication system.

As described above, according to the present embodiment, in the case of radio communication with a plurality of handsets by the TDMA system, because the transmission power can be controlled so that the received signal level at a handset located far from the base unit is an amount that slightly exceeds a predetermined threshold enabling maintenance of communication. Thus, it is possible to maintain communication with all handsets, while avoiding an increase in radio interference to another radio communication system as much as possible.

Although the present embodiment has been described for the case of the RSSI levels of a received notification signal being stored in memory section 103, this is not a restriction on the present invention, and another value such as a propagation path loss may be calculated and stored beforehand, for example.

(Embodiment 2)

Because the configurations of base unit 1 and handset 2 according to Embodiment 2 of the present invention are the same as those shown in FIG. 2 to FIG. 4 regarding Embodiment 1, the descriptions of the configurations of base unit 1 and handset 2 will make use of these drawings as appropriate.

In Embodiment 2 as well, as shown in FIG. 4, handset 2 is configured to enable the user to easily place handset 2 into and remove handset 2 from charging cradle 3. When handset 2 is placed into charging cradle 3, it is electrically connected to charging cradle 3, and a charging current from charging cradle 3 is accumulated in secondary battery 212. There are base units 1 configured to enable charging of handset 2. In this case, when handset 2 is placed into the charging part of base unit 1, it is electrically connected to base unit 1, and a charging current from base unit 1 is accumulated in secondary battery 212.

Because the power control table stored in memory section 103 of base unit 1 is the same as that shown in FIG. 6, the description of the power control table will be omitted. In addition, the descriptions of the measurement by the level measurement section 104a of the RSSI level of the notification signal, the processing of the notification by signal processing section 102, and storage into memory section 103 will be omitted because the measurement, processing and storage are the same as in the foregoing embodiment.

Similarly, the description of the transmission power control method when a control signal is transmitted on a control channel by the base unit according to the present embodiment will be omitted because the method is same as in the foregoing embodiment.

Figure 8:
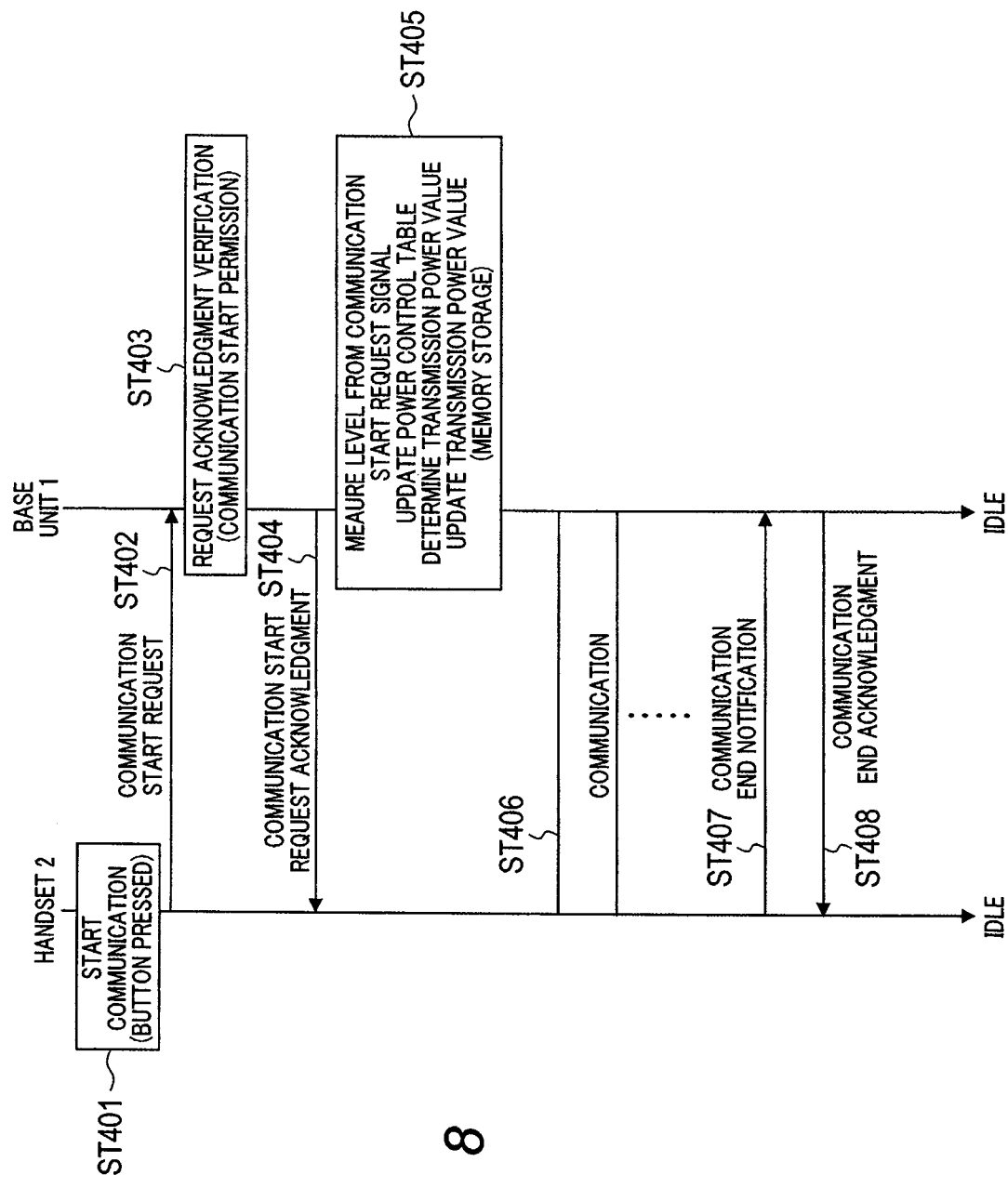
FIG. 8 is a sequence diagram between a base unit and a handset, indicating the transmission power determining procedure at the start of communication.

Next, the procedure for determining the transmission power at the start of communication will be described using FIG. 8. In FIG. 8, at step 401 (hereinafter, "step" will be indicated by prefixing the abbreviation ST to the step numbers), a communication start button on handset 2 is pressed, for example, to start communication with base unit 1. At ST402, handset 2 transmits a communication start request to base unit 1.

At ST403, base unit 1 verifies reception of the communication start request transmitted from handset 2, and permits the start of communication with handset 2. At ST404, base unit 1 transmits a communication start request acknowledgment to handset 2.

At ST405, base unit 1 measures the RSSI level of the communication start request signal and updates the power control table with the measured RSSI level. Base unit 1 also, based on the updated power control table, determines a transmission power value for transmitting a control signal to suit the handset having the weakest received signal level, as described above. The transmission power value stored in memory section 103 is updated with the determined transmission power value, the amplification of amplification section 104b is controlled by that transmission power value, and transmission power control is started.

At ST406, base unit 1 and handset 2 communicate with each other. At ST407, handset 2 notifies base unit 1 of the end of communication. At ST408, base unit 1 transmits a communication end acknowledgment to handset 2.

In this manner, base unit 1 measures the RSSI level of the communication start request signal transmitted from handset 2 and, based on the power control table that has been updated with the measured RSSI level, determines the transmission power value and performs transmission power control. In the case of performing radio communication with one or a plurality of handsets, this transmission power control enables maintenance of communication with handsets while avoiding an increase in radio interference to another radio communication system as much as possible.

Figure 9:
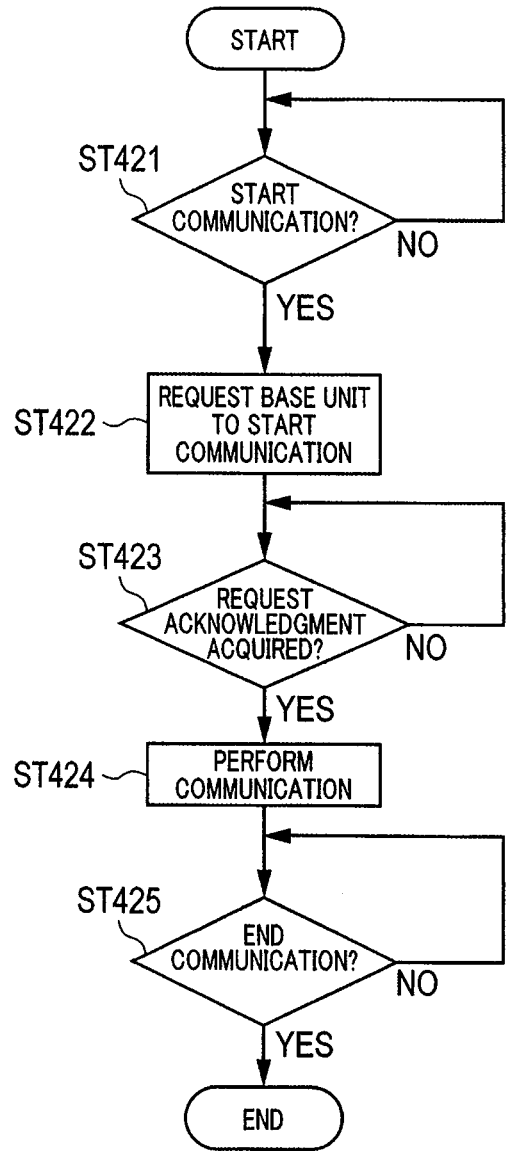
FIG. 9 is a flowchart showing the operation of the handset shown in FIG. 8.

Next, the operation of handset 2 shown in FIG. 8 will be described using FIG. 9. In FIG. 9, at ST421, handset 2 judges whether or not there has been an instruction to start communication by, for example, pressing a communication start button. If there has been a communication start instruction (YES at ST421), the flow goes to ST422, and if there has not been a communication start instruction (NO at ST421), the flow returns to ST421.

At ST422, handset 2 requests base unit 1 to start communication. At ST423, handset 2 judges whether or not a communication start request acknowledgment (communication start permission) has been acquired from base unit 1. If handset 2 has acquired permission (YES at ST423), the flow goes to ST424, and if it has not acquired permission (NO at ST423), the flow returns to ST422.

At ST424, handset 2 communicates with base unit 1. At ST425, handset 2 judges whether or not communication is to end. If handset 2 is to end communication (YES at ST425), the flow ends, and if handset 2 is not to end communication (NO at ST425), the flow returns to ST425.

Figure 10:
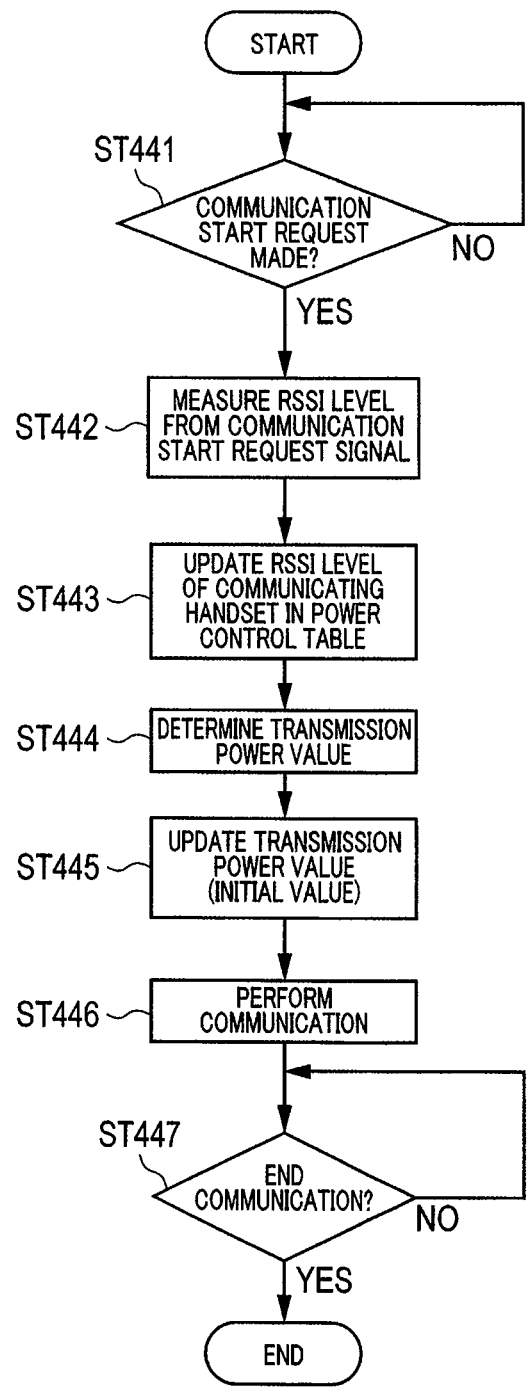
FIG. 10 is a flowchart showing the operation of the base unit shown in FIG. 8.

Next, the operation of base unit 1 shown in FIG. 8 will be described using FIG. 10. In FIG. 10, at ST441, base unit 1 judges whether or not there is a communication start request from handset 2. If there is a communication start request (YES at ST441), the flow goes to ST442, and if there is no communication start request (NO at ST441), the flow returns to ST441.

At ST442, base unit 1 measures the RSSI level of the communication start request signal transmitted from handset 2. At ST443, base unit 1 updates the RSSI level in the power control table of the handset 2 currently communicating.

At ST444, base unit 1 determines the transmission power value. At ST445, base unit 1 updates the initial value of the transmission power value and starts transmission power control.

At ST446, base unit 1 communicates with handset 2. At ST447, base unit 1 judges whether communication is to be ended. If base unit 1 is to end communication (YES at ST447), the flow ends, and if base unit 1 is not to end communication (NO at ST447), the flow returns to ST447.

In this manner, according to Embodiment 2, base unit 1 measures the RSSI level of the communication start request signal transmitted from handset 2 and, based on the minimum RSSI level in the power control table that has been updated with the measured RSSI level, determines the transmission power value and controls the transmission power. In the case of performing radio communication with one or a plurality of handsets, this transmission power control enables maintenance of communication with handsets while avoiding an increase in radio interference to another radio communication system as much as possible.

Although the present embodiment has been described for the case of a call initiated by handset 2, it can be applied also to the case of a call initiated by base unit 1. In this case, a communication start request is transmitted from base unit 1 to handset 2, and the RSSI level of the acknowledgment signal for the communication start request signal transmitted by handset 2 is measured.

Figure 11:
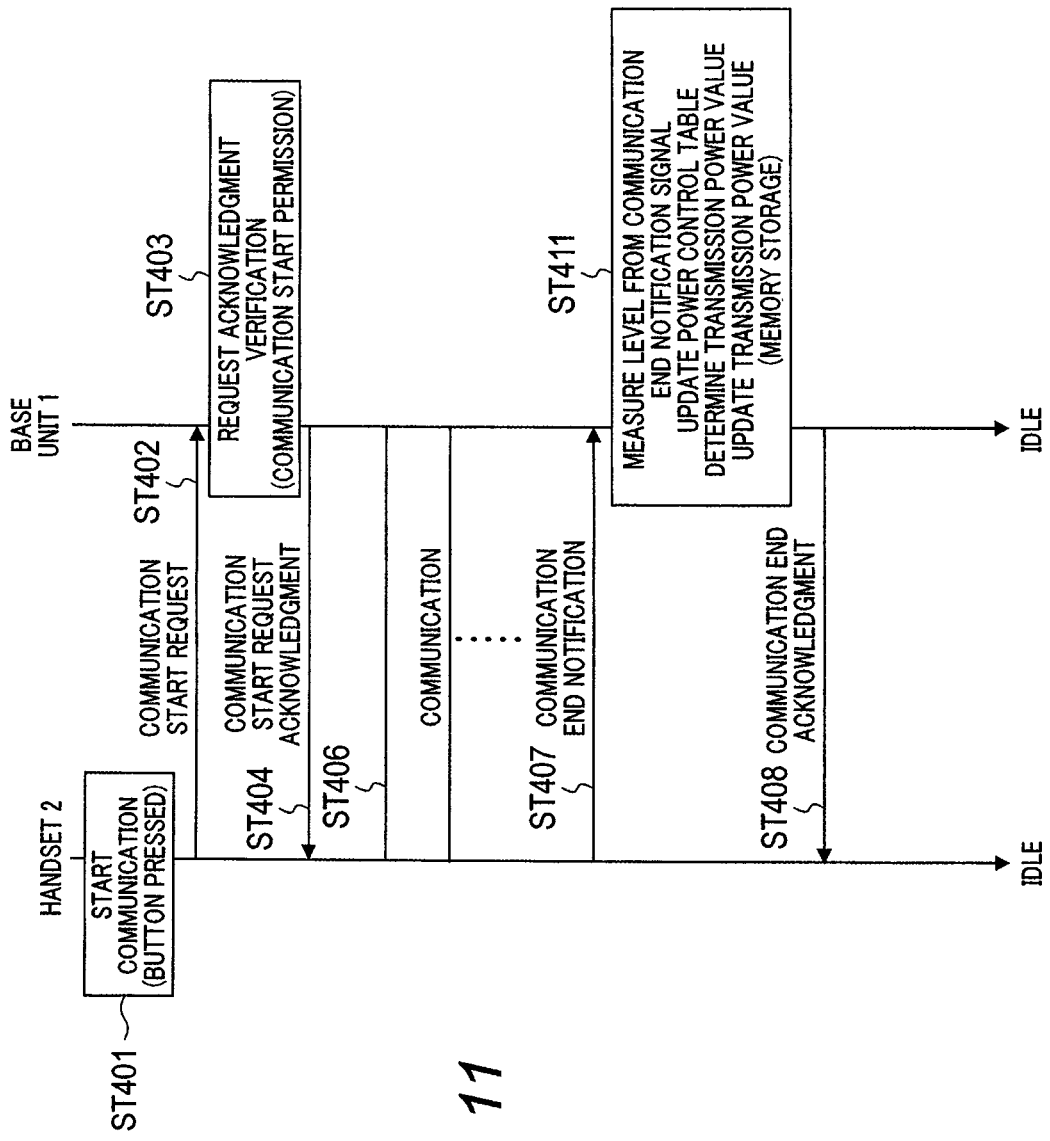
FIG. 11 is a sequence diagram between a base unit and a handset, showing the transmission power determining procedure at the end of communication.

In addition, although in the present embodiment the description has been provided for the case in which the transmission power value is determined based on the communication start request signal transmitted from handset 2 at the start of communication, in the present invention the transmission power value may be determined at the end of communication. The transmission power determining procedure of this case is shown in FIG. 11, in which parts that are in common with ones shown in FIG. 8 have been assigned the same reference signs.

The differences in FIG. 11 from FIG. 8 are as follows. Specifically, at ST411, base unit 1 measures the RSSI level of a communication end notification signal notified to base unit 1 by handset 2, and updates the power control table. Base unit 1 also determines the transmission power value based on the updated power control table, updates the transmission power value stored in memory section 103, and starts transmission power control. The determination of the transmission power may be made after transmission of the communication end acknowledgment at ST408.

Determining the transmission power at the end of communication enables the start of the next communication with the appropriate transmission power because the positional relationship between base unit 1 and handset 2 at the end of communication is likely to be the same as the positional relationship therebetween at the start of the next communication.

(Embodiment 3)

Because the configurations of base unit 1 and handset 2 according to Embodiment 3 of the present invention are the same as those shown in FIG. 2 to FIG. 4 regarding Embodiment 1, the descriptions of the configurations of base unit 1 and handset 2 will make use of these drawings as appropriate.

The procedure for determining the transmission power at the start of handset registration in Embodiment 3 of the present invention will be described using FIG. 12. In this case, handset registration refers to processing to register an unregistered handset to the base unit.

Figure 12:
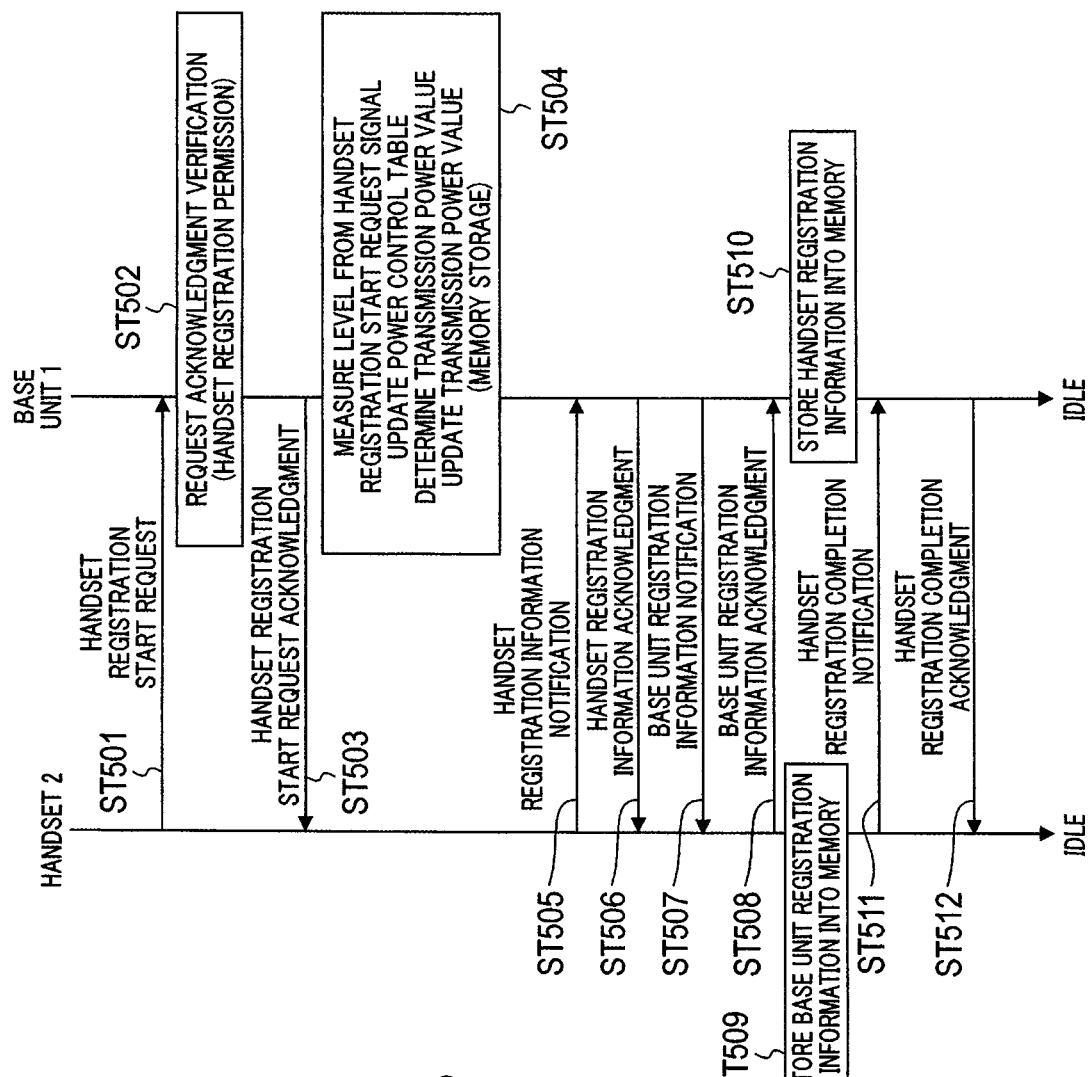
FIG. 12 is a sequence diagram between a base unit and a handset, showing the transmission power determining procedure at the start of registration of the handset.

In FIG. 12, at ST501, handset 2 transmits a handset registration start request to base unit 1. At ST502, base unit 1 verifies acknowledgment of the handset registration start request transmitted from handset 2, and permits registration of handset 2.

At ST503, base unit 1 transmits a handset registration start request acknowledgment to handset 2. At ST504, base unit 1 measures the RSSI level of the handset registration start request signal and updates the power control table with the measured RSSI level. In this embodiment as well, base unit 1 determines the transmission power value for transmitting the control signal to suit the handset having the weakest signal level. Base unit 1 then updates the transmission power value stored in memory section 103 with the determined transmission power value, and starts transmission power control.

At ST505, handset 2 notifies base unit 1 of handset registration information. At ST506, base unit 1 transmits to handset 2 an acknowledgment for the handset registration information. At ST507, base unit 1 notifies handset 2 of base unit registration information.

At ST508, handset 2 transmits to base unit 1 an acknowledgment for the base unit registration information. At ST509, handset 2 stores the base unit registration information into memory section 202 and, at ST510 while base unit 1 stores the handset registration information into memory section 103.

At ST511, handset 2 notifies base unit 1 of the completion of handset registration. At ST512, base unit 1 transmits to handset 2 an acknowledgment for the handset registration completion.

In this manner, base unit 1 measures the RSSI level of the handset registration start request signal transmitted from handset 2, determines the transmission power value based on the power control table updated with the measured RSSI level, and performs transmission power control. In the case of performing radio communication with one or a plurality of handsets, this transmission power control enables maintenance of communication with handsets while avoiding an increase in radio interference to another radio communication system as much as possible.

Next, the operation of handset 2 shown in FIG. 12 will be described using FIG. 13. It is assumed that handset 2 is not registered to base unit 1 and does not operate even when the power is turn ON, and handset 2 waits for the register button to be pressed at the starting point in FIG. 13.

Figure 13:
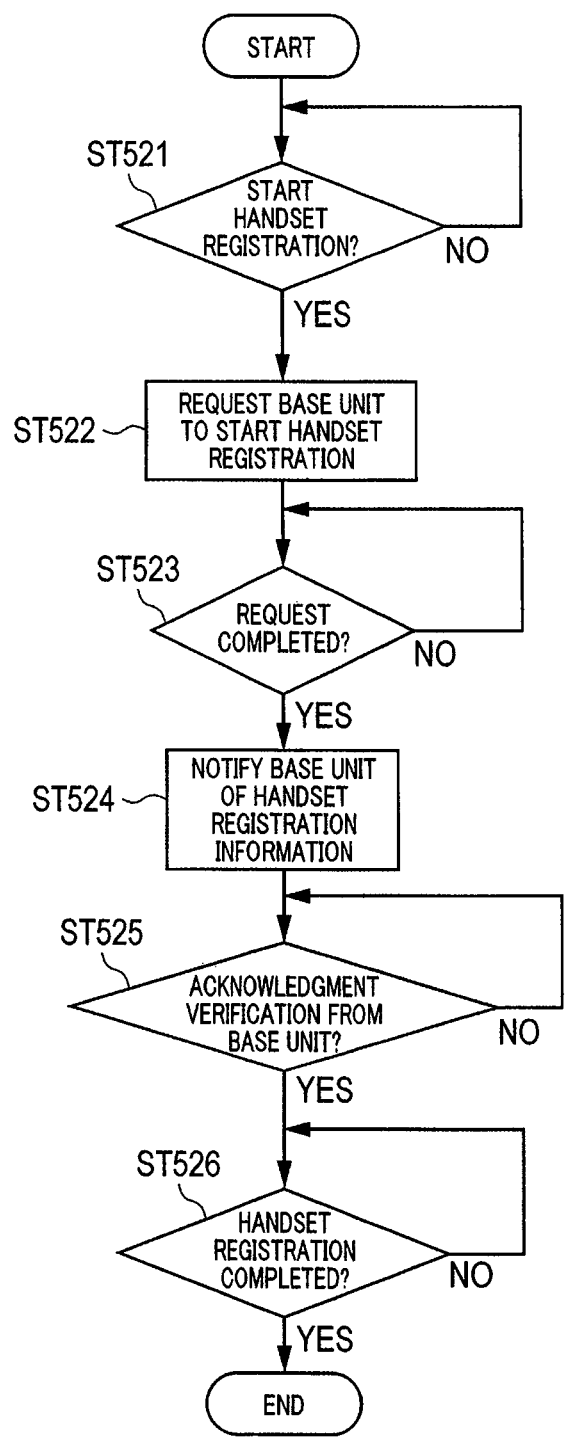
FIG. 13 is a flowchart showing the operation of the handset shown in FIG. 12.

In FIG. 13, at ST521, handset 2 judges whether or not handset registration is to be started. If handset 2 is to start handset registration (YES at ST521), the flow goes to ST522, and if handset 2 is not to start handset registration (NO at ST521), the flow returns to ST521.

At ST522, handset 2 requests base unit 1 to start registering handset. At ST523, handset 2 judges whether or not the handset registration start request has been completed. If it has been completed (YES at ST523), the flow goes to ST524, and if it has not been completed (NO at ST523), the flow returns to ST522.

At ST524, handset 2 notifies base unit 1 of handset registration information. At ST525, handset 2 judges whether or not verification was possible of the notification of acknowledgment of the handset registration information from base unit 1. If verification has been made (YES at ST525), the flow goes to ST526, and if verification has not been made (NO at ST525), the flow returns to ST524. The sequence of ST524 and ST525 may be reversed.

At ST526, handset 2 judges whether or not the handset registration has been completed. If it has been completed (YES at ST526), the flow ends, and if it has not been completed (NO at ST526), the flow returns to ST526.

Next, the operation of base unit 1 shown in FIG. 12 will be described using FIG. 14. It is assumed that the transmission power value of base unit 1 is set to the initial value at the starting point in FIG. 14. If no handsets are registered, the initial value of the transmission power value may be set to the full power (maximum transmission power value) of base unit 1 or to the minimum transmission power value. In the case in which another handset has already been registered, the initial value of the transmission power value may be set to the full power of base unit 1 or an already-determined transmission power value.

Figure 14:
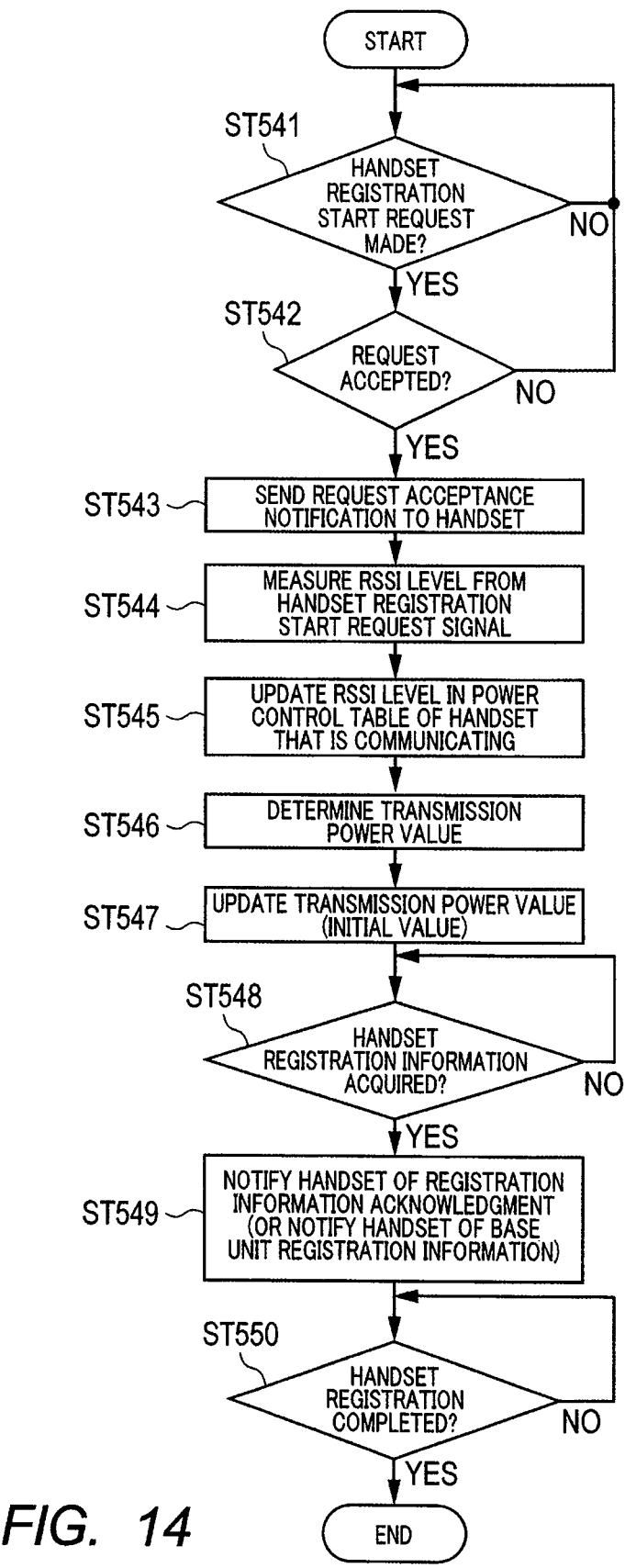
FIG. 14 is a flowchart showing the operation of the base unit shown in FIG. 12.

In FIG. 14, at ST541, base unit 1 judges whether there is a handset registration start request from handset 2. If there is a request (YES at ST541), the flow goes to ST542, and if there is no request (NO at ST541), the flow returns to ST541.

At ST542, base unit 1 authenticates handset 2 that transmitted the handset registration start request and judges whether or not to accept the handset registration start request. If it is to be accepted (YES at ST542), the flow goes to ST543, and if it is not to be accepted (NO at ST542), the flow returns to ST542. At ST543, base unit 1 sends a handset registration acceptance notification to handset 2.

At ST544, base unit 1 measures the RSSI level of the handset registration start request signal transmitted from handset 2. At ST545, base unit 1 updates the RSSI level in the power control table of handset 2 that is communicating.

At ST546, base unit 1 determines the transmission power value. At ST547, base unit 1 updates the initial value of the transmission power value and starts transmission power control.

At ST548, base unit 1 judges whether or not handset registration information has been acquired. If it has been acquired (YES at ST548), the flow goes to ST549, and if it has not been acquired (NO at ST548), the flow returns to ST548.

At ST549, base unit 1 notifies handset 2 of acknowledgment of the handset registration information or base unit registration information. The sequence of ST548 and ST549 may be reversed.

At ST550, base unit 1 judges whether or not the handset registration has been completed. If it has been completed (YES at ST550), the flow ends, and if it has not been completed (NO at ST550), the flow returns to ST550.

In this manner, according to Embodiment 3, base unit 1 measures the RSSI level of the handset registration start request signal transmitted from handset 2 and, based on the minimum RSSI level in the power control table that has been updated with the measured RSSI level, determines the transmission power value and performs transmission power control. In the case of performing radio communication with one or a plurality of handsets, this transmission power control enables maintenance of communication with handsets while avoiding an increase in radio interference to another radio communication system as much as possible.

Figure 15:
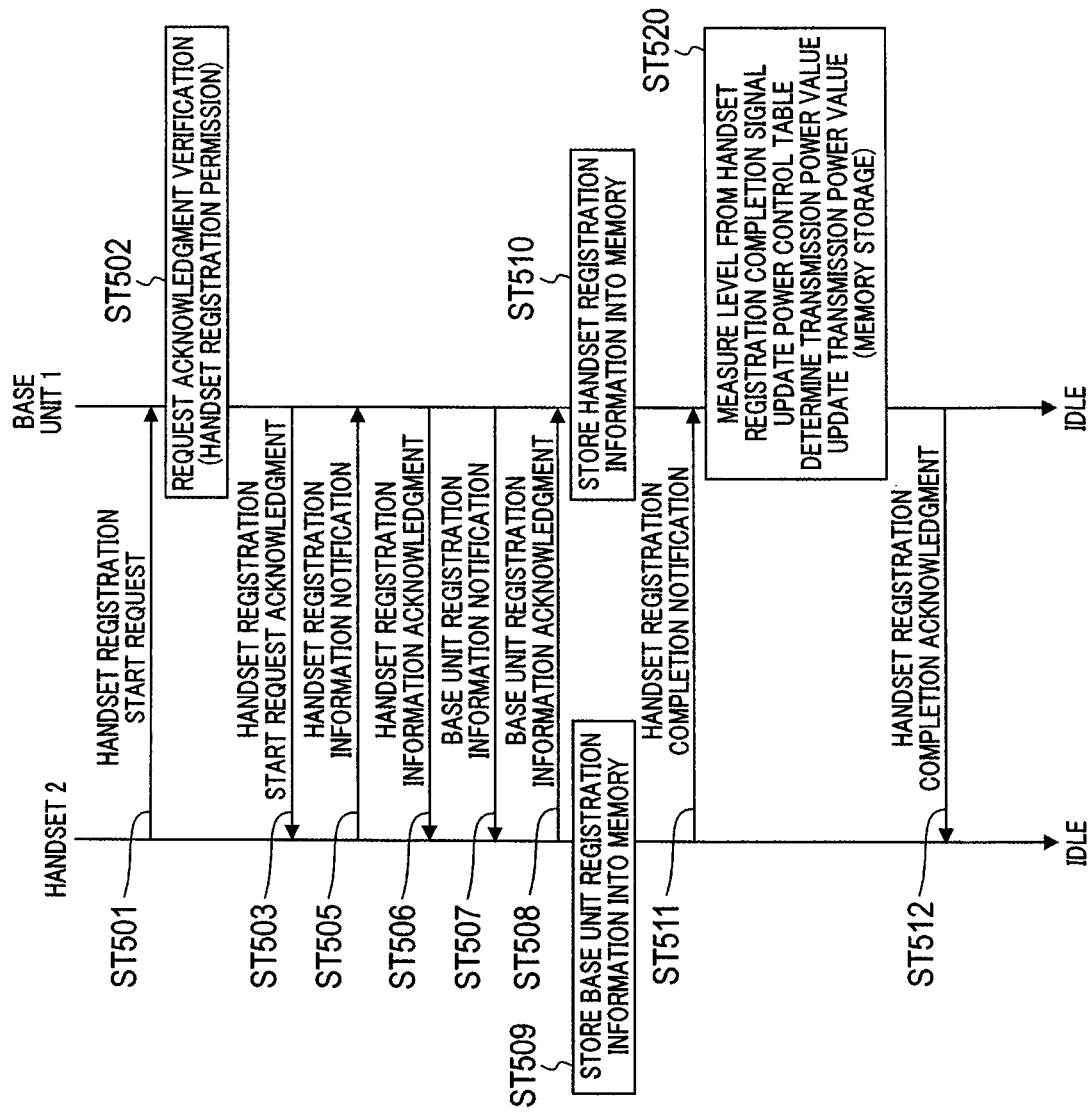
FIG. 15 is a sequence diagram between a base unit and a handset, showing the transmission power determining procedure at the end of registration of the handset.

Also, although in the present embodiment the description has been provided for the case in which the transmission power value is determined based on the handset registration start request signal transmitted from handset 2 at the start of handset registration, in the present invention, the transmission power value may be determined at the end of handset registration. The transmission power determining procedure in this case is shown in FIG. 15, in which parts that are in common with ones shown in FIG. 12 have been assigned the same reference signs.

The differences in FIG. 15 from FIG. 12 are as follows. Specifically, at ST520, base unit 1 measures the RSSI level of a handset registration completion notification signal notified to base unit 1 by handset 2, and updates the power control table. In this case as well, base unit 1 also determines the transmission power value for transmitting the control signal to suit the handset with the weakest received signal level. Base unit 1 then updates the transmission power value stored in memory section 103 with this determined transmission power value, and starts transmission power control. The determination of the transmission power value may be made after transmission of the handset registration completion acknowledgment at ST512.

Figure 16:
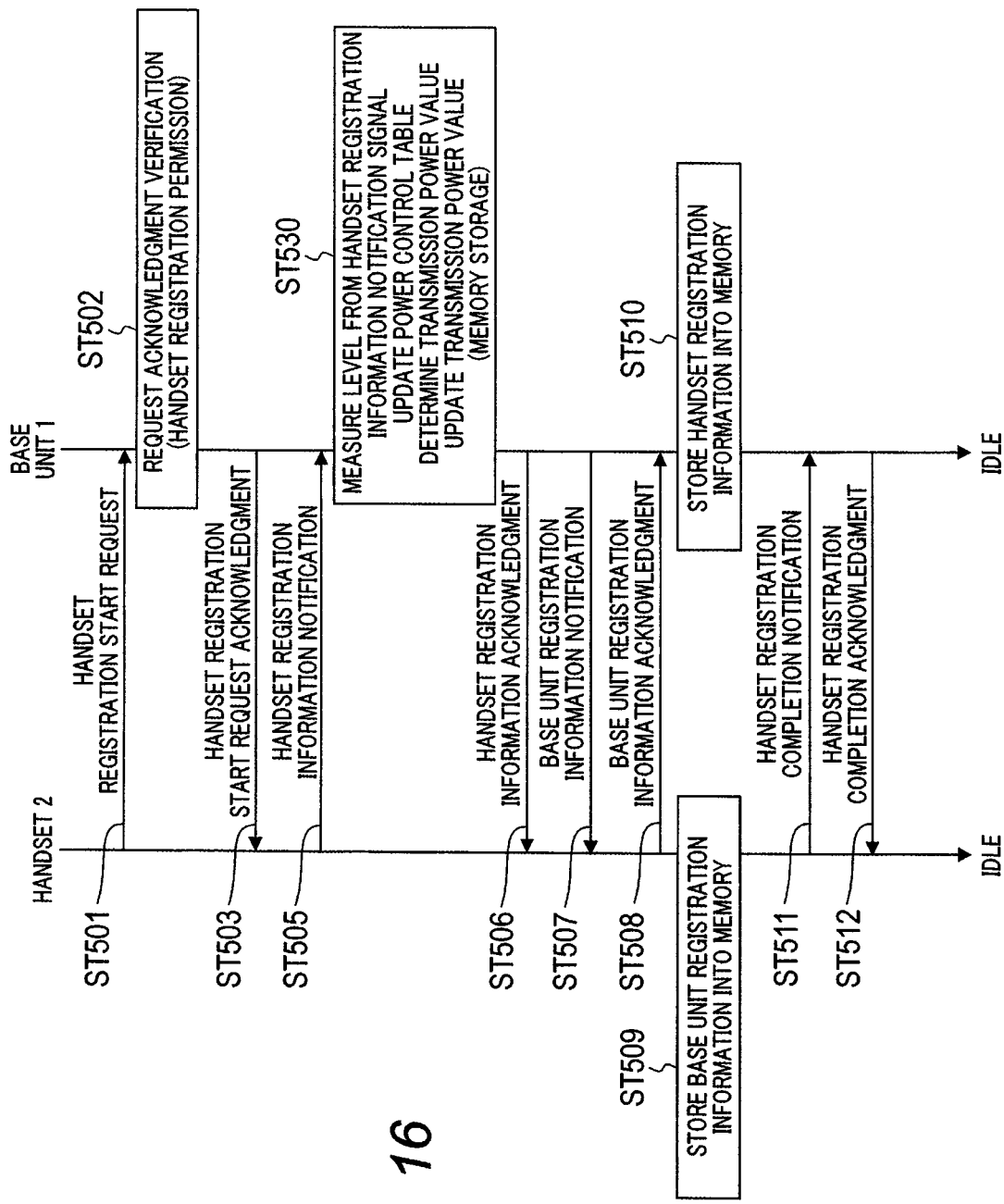
FIG. 16 is a sequence diagram between a base unit and a handset, showing the transmission power determining procedure during handset registration.

Base unit 1 may determine the transmission power value during the handset registration. The procedure for determining the transmission power in this case is shown in FIG. 16. In FIG. 16, parts that are in common with ones shown in FIG. 12 have been assigned the same reference signs.

The differences in FIG. 16 from FIG. 12 are as follows. Specifically, at ST530, base unit 1 measures the RSSI level of a handset registration information notification signal notified to base unit 1 by handset 2, and updates the power control table. In this case as well, base unit 1 also determines the transmission power value for transmitting the control signal to suit the handset with the weakest received signal level, based on the updated power control table, updates the transmission power value stored in memory section 103, and starts transmission power control.

(Embodiment 4)

Because the configurations of base unit 1 and handset 2 according to Embodiment 4 of the present invention are the same as those shown in FIG. 2 to FIG. 4 regarding Embodiment 1, the descriptions of the configurations of base unit 1 and handset 2 will make use of these drawings as appropriate.

The procedure for determining the transmission power at the start of position registration in Embodiment 4 of the present invention will be described using FIG. 17. In this case, position registration refers to processing of re-connecting to the base unit a handset registered to the base unit when the power for the handset has been set to on or when the handset returns from being out-of-range.

Figure 17:
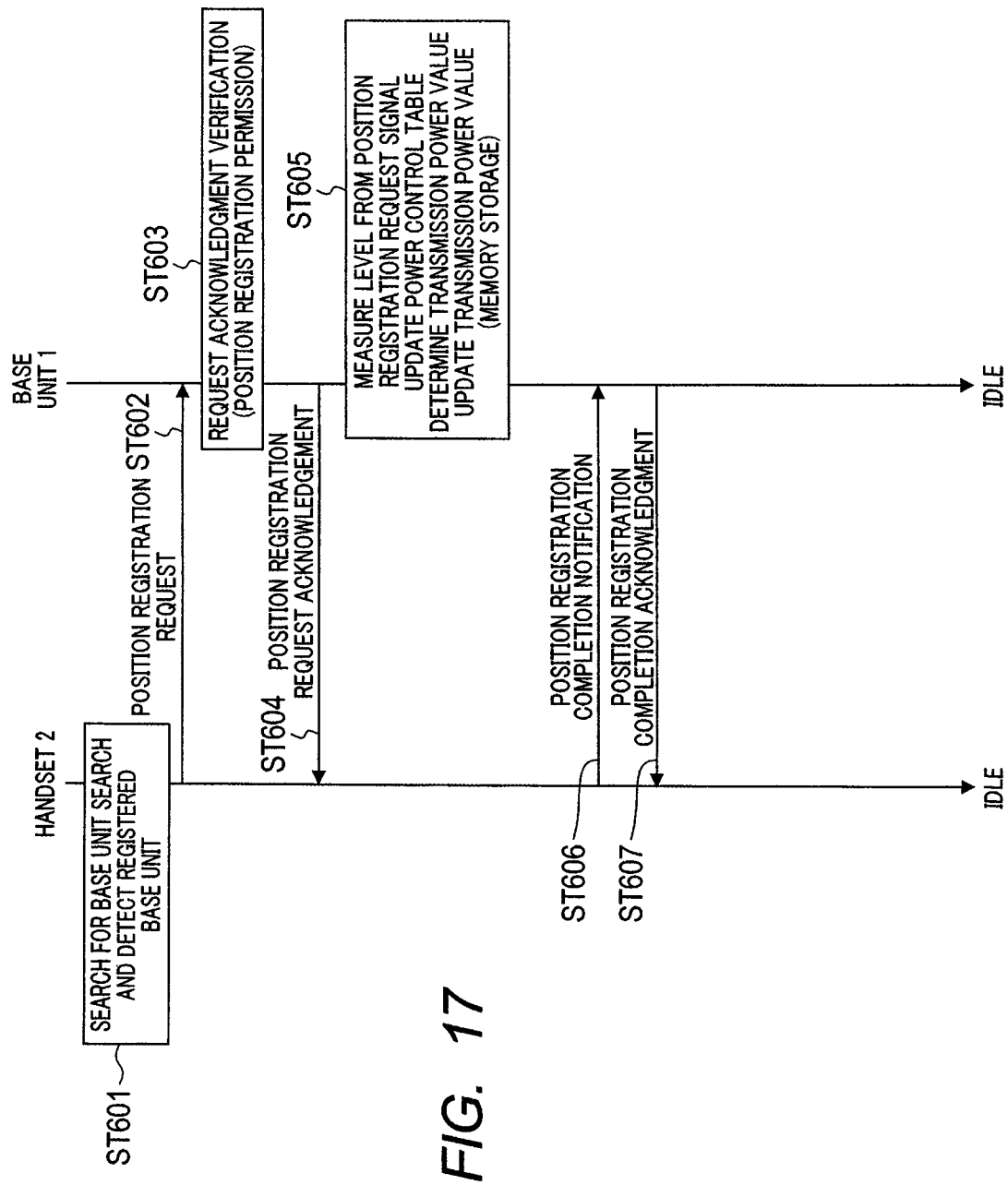
FIG. 17 is a sequence diagram between a base unit and a handset, showing the transmission power determining procedure at the start of position registration.

In FIG. 17, at ST601, handset 2 starts searching for a base unit and detects base unit 1.

At ST602, handset 2 transmits a position registration request to base unit 1. At ST603, base unit 1 verifies acknowledgment of the position registration request transmitted from handset 2 and permits registration of the position of handset 2.

At ST604, base unit 1 transmits a position registration request acknowledgment to handset 2. At ST605, base unit 1 measures the RSSI level of the position registration request signal and updates the power control table. In this case as well, base unit 1 also determines the transmission power value for transmitting the control signal to suit the handset with the weakest received signal level based on the updated power control table, updates the transmission power value stored in memory section 103, and starts transmission power control.

At ST606, handset 2 notifies base unit 1 of position registration completion. At ST607, base unit 1 transmits to handset 2 an acknowledgment of the position registration completion.

In this manner, base unit 1 measures the RSSI level of the position registration request signal transmitted from handset 2 and, based on the power control table updated with the measured RSSI level, determines the transmission power value and performs transmission power control. In the case of performing radio communication with one or a plurality of handsets, this enables maintenance of communication with handsets while avoiding an increase in radio interference to another radio communication system as much as possible.

Figure 18:
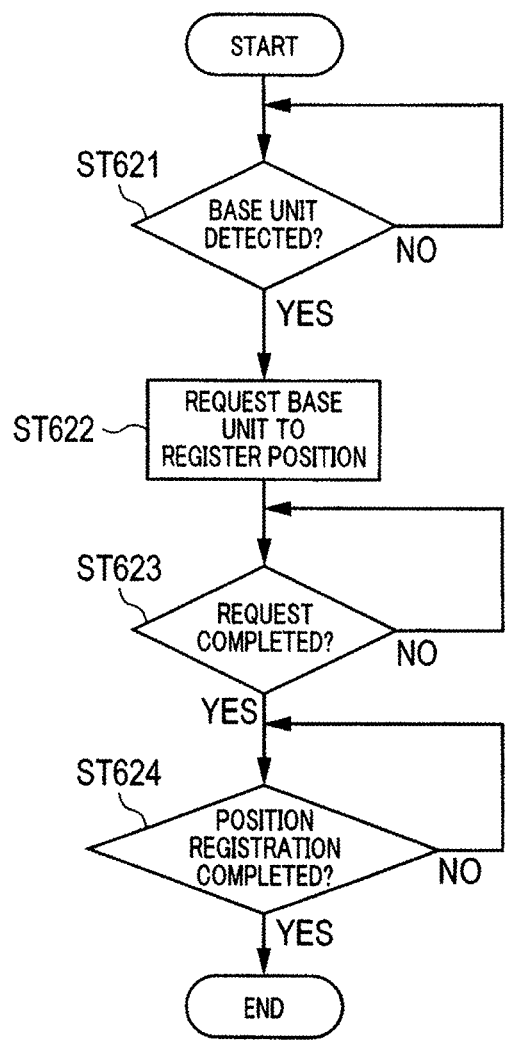
FIG. 18 is a flowchart showing the operation of the handset shown in FIG. 17.

Next, the operation of handset 2 shown in FIG. 17 will be described using FIG. 18. In FIG. 18, at ST621, handset 2 starts searching for base unit 1 and judges whether or not base unit 1 has been detected. If it has been detected (YES at ST621), the flow goes to ST622, and if it has not been detected (NO at ST621), the flow returns to ST621.

At ST622, handset 2 transmits a position registration request to base unit 1. At ST623, handset 2 judges whether or not the position registration request to base unit 1 has been completed. If it has been completed (YES at ST623), the flow goes to ST624, and if it has not been completed (NO at ST623), the flow returns to S623.

At ST624, handset 2 judges whether or not the position registration has been completed. If it has been completed (YES at ST624), the flow ends, and if it has not been completed (NO at ST624), the flow returns to ST624.

Next, the operation of base unit 1 shown in FIG. 17 will be described using FIG. 19. It is assumed that the transmission power value of base unit 1 is set to the initial value at the starting point in FIG. 19. The initial value of the transmission power value may be set to a transmission power value determined in processing performed before the position registration, such as at handset registration or when communicating. In the case in which the target handset is out of the coverage area of base unit 1 or has its power switched off, so that the target handset is not in the coverage area of base unit 1, the initial value of the transmission power value may be set to the full power of base unit 1.

Figure 19:
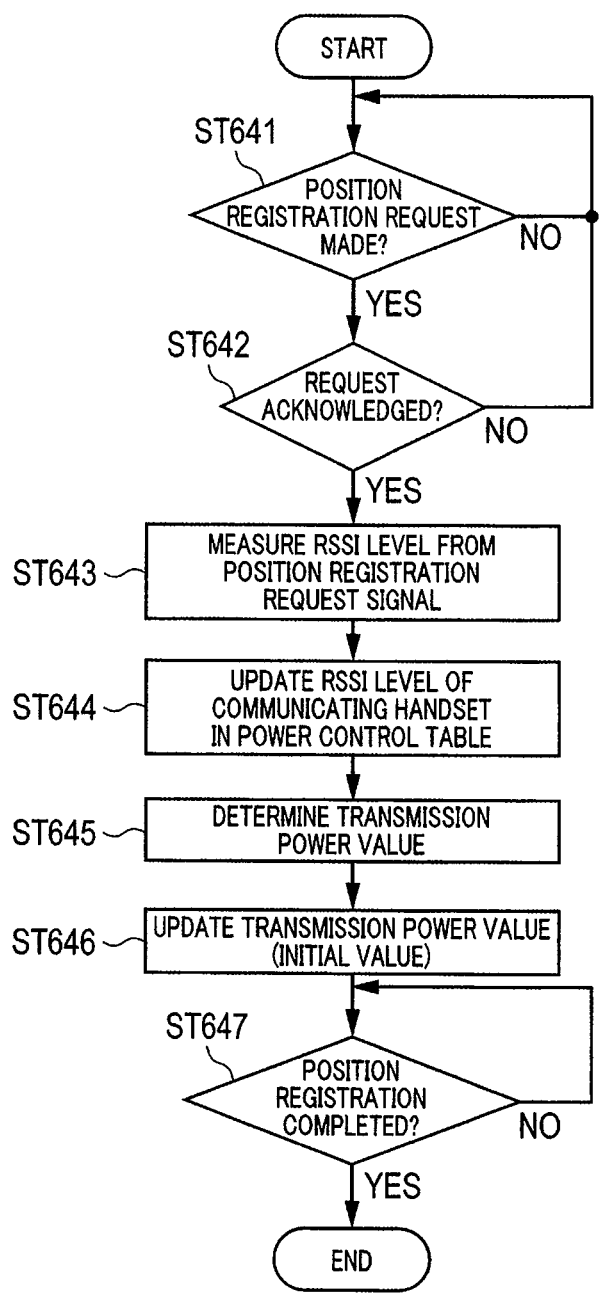
FIG. 19 is a flowchart showing the operation of the base unit shown in FIG. 17.

In FIG. 19, at ST641, base unit 1 judges whether or not there is a position registration request from handset 2. If there is a position registration request (YES at ST641), the flow goes to ST642, and if there is no position registration request (NO at ST641), the flow returns to ST641.

At ST642, base unit 1 authenticates handset 2 that transmitted the position registration request and judges whether or not to accept the position registration request. If it is to be accepted (YES at ST642), the flow goes to ST643, and if it is not to be accepted (NO at ST642), the flow returns to ST641.

At ST643, base unit 1 measures the RSSI level of the position registration request signal transmitted from handset 2. At ST644, base unit 1 updates the RSSI level in the power control table of handset 2 that is communicating.

At ST645, base unit 1 determines the transmission power value. At ST646, base unit 1 updates the initial value of the transmission power value and starts transmission power control.

At ST647, base unit 1 judges whether or not the position registration has been completed. If it has been completed (YES at ST647), the flow ends, and if it has not been completed (NO at ST647), the flow returns to ST647.

In this manner, according to Embodiment 4, base unit 1 measures the RSSI level of the position registration request transmitted from handset 2, and, based on the minimum RSSI level in the power control table that has been updated with the measured RSSI level, determines the transmission power value and performs transmission power control. In the case of performing radio communication with one or a plurality of handsets, this enables maintenance of communication with handsets while avoiding an increase in radio interference to another radio communication system as much as possible.

Figure 20:
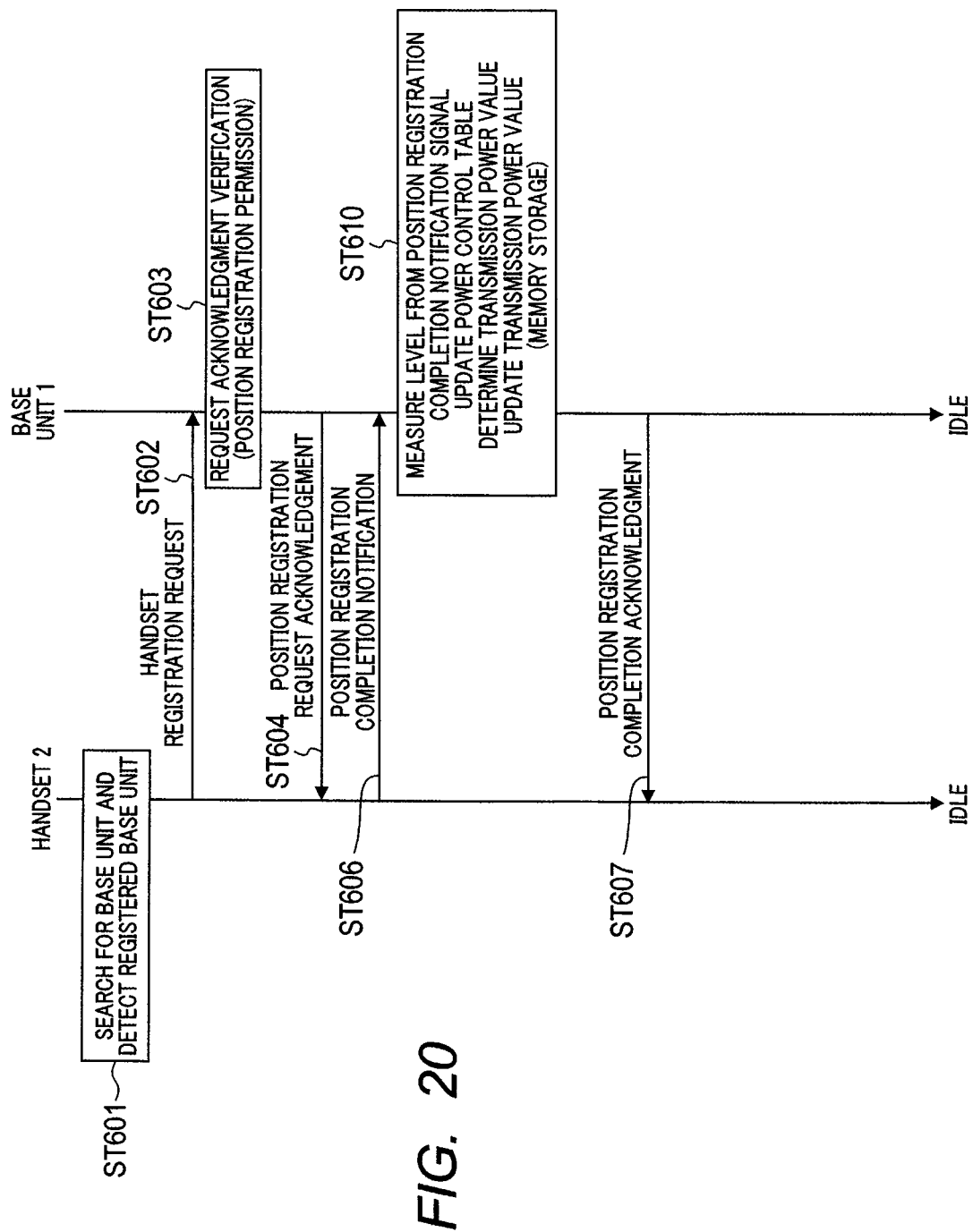
FIG. 20 is a sequence diagram between a base unit and a handset, showing the transmission power determining procedure at the end of position registration.

Also, although, in the present embodiment, the description has been provided for the case in which the transmission power value is determined based on the position registration request signal transmitted from handset 2 at the start of position registration, the present invention may determine the transmission power value at the end of the position registration. The procedure for determining the transmission power in this case is shown in FIG. 20. In FIG. 20, parts that are the same as ones shown in FIG. 17 have been assigned the same reference signs.

The differences in FIG. 20 from FIG. 17 are as follows. Specifically, at ST610, base unit 1 measures the RSSI level of a position registration completion notification signal notified to base unit 1 by handset 2, and updates the power control table with the measured RSSI level. Base unit 1 determines the transmission power value for transmitting the control signal to suit the handset having the weakest received signal level based on the updated power control table, updates the transmission power value stored in memory section 103, and starts transmission power control. The determination of the transmission power value may be made after transmission of the position registration completion notification at ST607.

(Embodiment 5)

Because the configurations of base unit 1 and handset 2 according to Embodiment 5 of the present invention are the same as those shown in FIG. 2 to FIG. 4 regarding Embodiment 1, the descriptions of the configurations of base unit 1 and handset 2 will make use of these drawings as appropriate.

Figure 21:
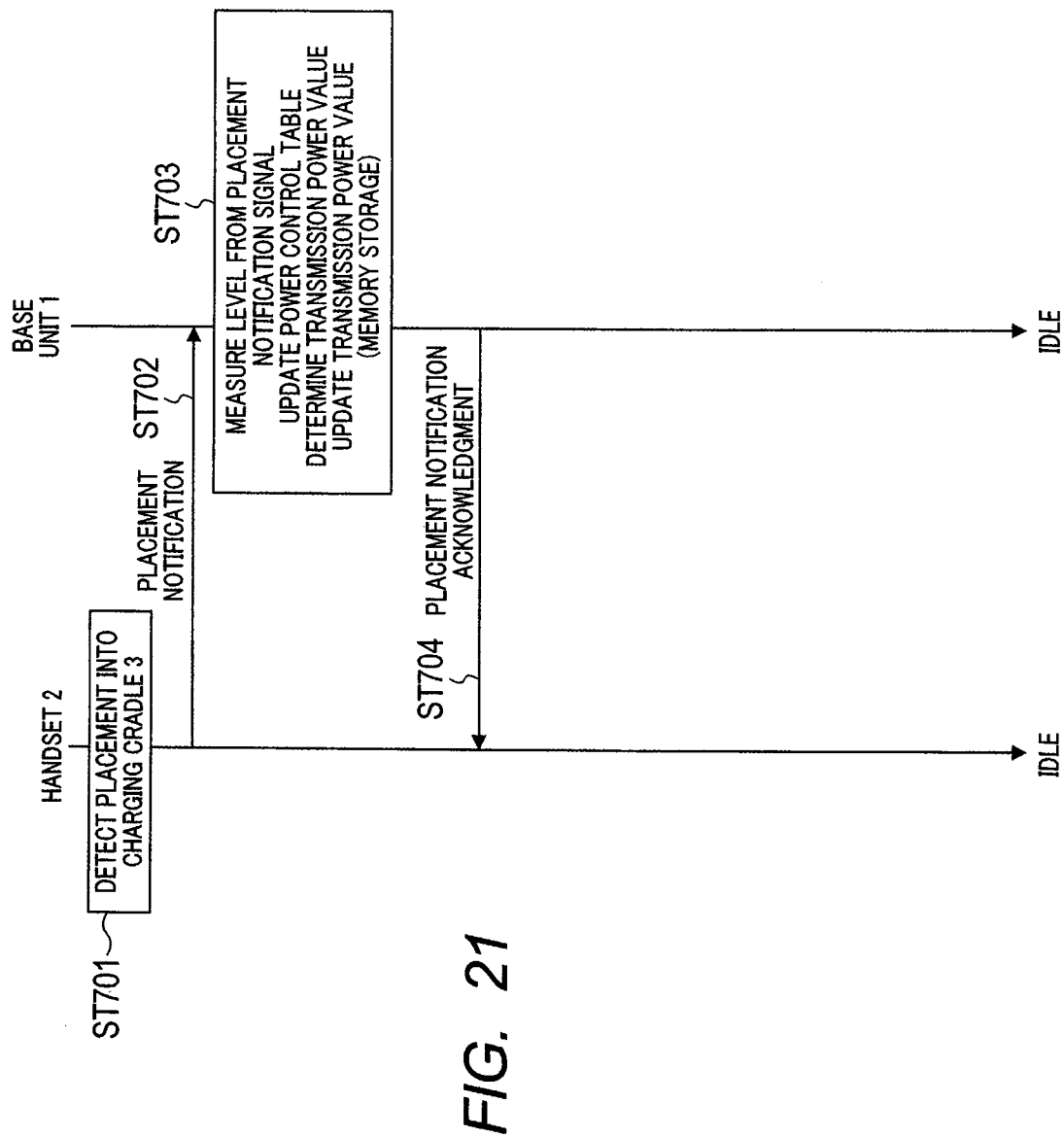
FIG. 21 is a sequence diagram between a base unit and a handset, showing the transmission power determining procedure at the time of placement into the charging cradle.

The procedure for determining the transmission power at the time of placement into the charging cradle in Embodiment 5 of the present invention will be described using FIG. 21. In FIG. 21, at ST701, handset 2 detects that it has been placed into charging cradle 3. At ST702, handset 2 transmits to base unit 1 a placement notification indicating placement into charging cradle 3.

At ST703, base unit 1 measures the RSSI level of the placement notification signal transmitted from handset 2 and updates the power control table with the measured RSSI level. Base unit 1 determines the transmission power value for transmitting the control signal to suit the handset having the weakest received signal level, based on the updated power control table, updates the transmission power value stored in memory section 103, and starts transmission power control.

At ST704, base unit 1 transmits a placement notification acknowledgment to handset 2.

In this manner, base unit 1 measures the RSSI level of the placement notification signal transmitted from handset 2, and based on the power control table updated with the measured RSSI level, determines the transmission power value and performs transmission power control. In the case of performing radio communication with one or a plurality of handsets, this enables maintenance of communication with handsets while avoiding an increase in radio interference to another radio communication system as much as possible.

Figure 22:
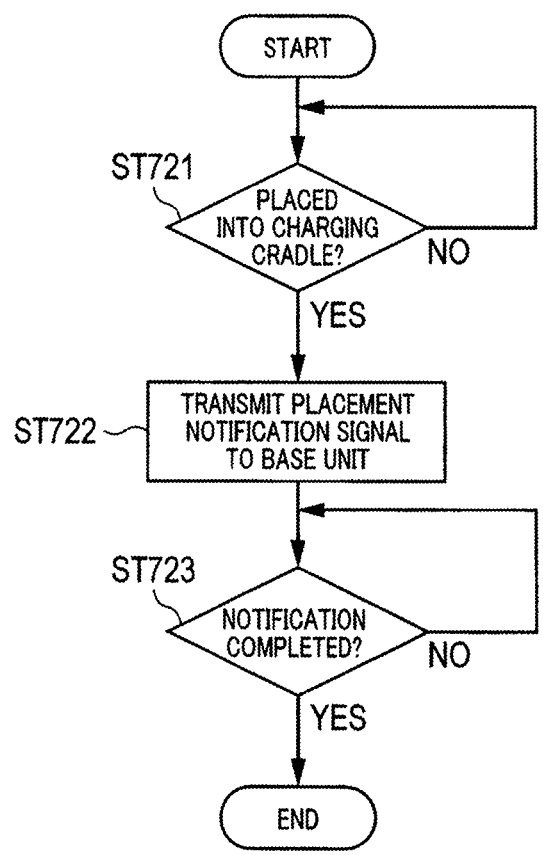
FIG. 22 is a flowchart showing the operation of the handset shown in FIG. 21.

Next, the operation of handset 2 shown in FIG. 21 will be described using FIG. 22. In FIG. 22, at ST721, handset 2 judges whether or not handset 2 has been placed into charging cradle 3. If it has been placed (YES at ST721), the flow goes to ST722, and if it has not been placed (NO at ST721), the flow returns to ST721.

At ST722, handset 2 transmits a placement notification signal to base unit 1. At ST723, handset 2 judges whether or not the placement notification has been completed. If it has been completed (YES at ST723), the flow ends, and if it has not been completed (NO at ST723), the flow returns to ST723.

Figure 23:
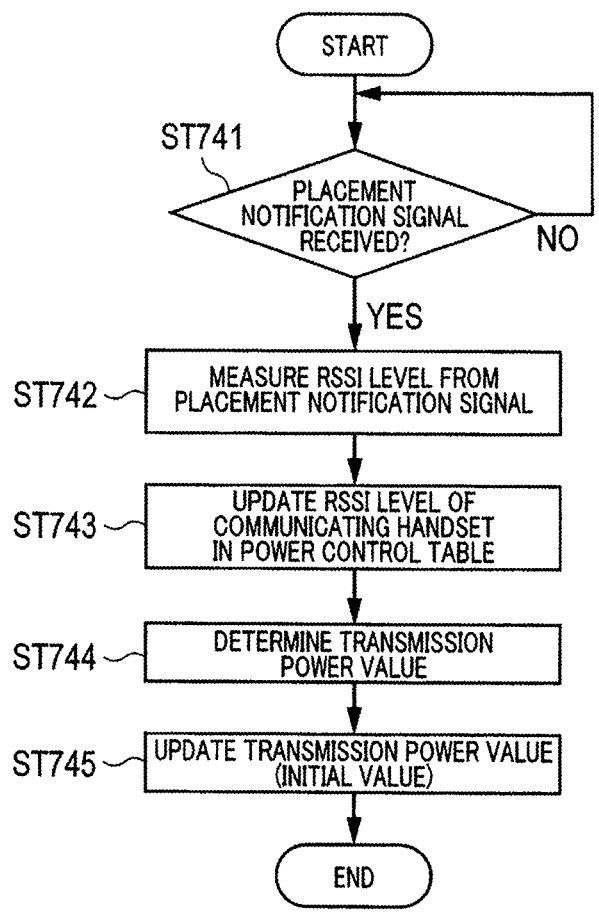
FIG. 23 is a flowchart showing the operation of the base unit shown in FIG. 21.

Next, the operation of base unit 1 shown in FIG. 21 will be described using FIG. 23. In FIG. 23, at ST741, base unit 1 judges whether or not the placement notification signal has been received from handset 2. If it has been received (YES at ST741), the flow goes to ST742, and if it has not been received (NO at ST741), the flow returns to ST741.

At ST742, base unit 1 measures the RSSI level of the placement notification signal transmitted from handset 2. At ST743, base unit 1 updates the RSSI level in the power control table of handset 2 that is communicating.

At ST744, base unit 1 determines the transmission power value. At ST745, base unit 1 updates the initial value of the transmission power value and starts transmission power control, and then the flow ends.

In this manner, according to Embodiment 5, base unit 1 measures the RSSI level of the placement notification signal transmitted from handset 2, determines the transmission power value based on the minimum RSSI level in the power control table updated with the measured RSSI level, and performs transmission power control. In the case of performing radio communication with one or a plurality of handsets, this enables maintenance of communication with handsets while avoiding an increase in radio interference to another radio communication system as much as possible.

(Embodiment 6)

Because the configurations of base unit 1 and handset 2 according to Embodiment 6 of the present invention are the same as those shown in FIG. 2 to FIG. 4 regarding Embodiment 1, the descriptions of the configurations of base unit 1 and handset 2 will make use of these drawings as appropriate.

Figure 24:
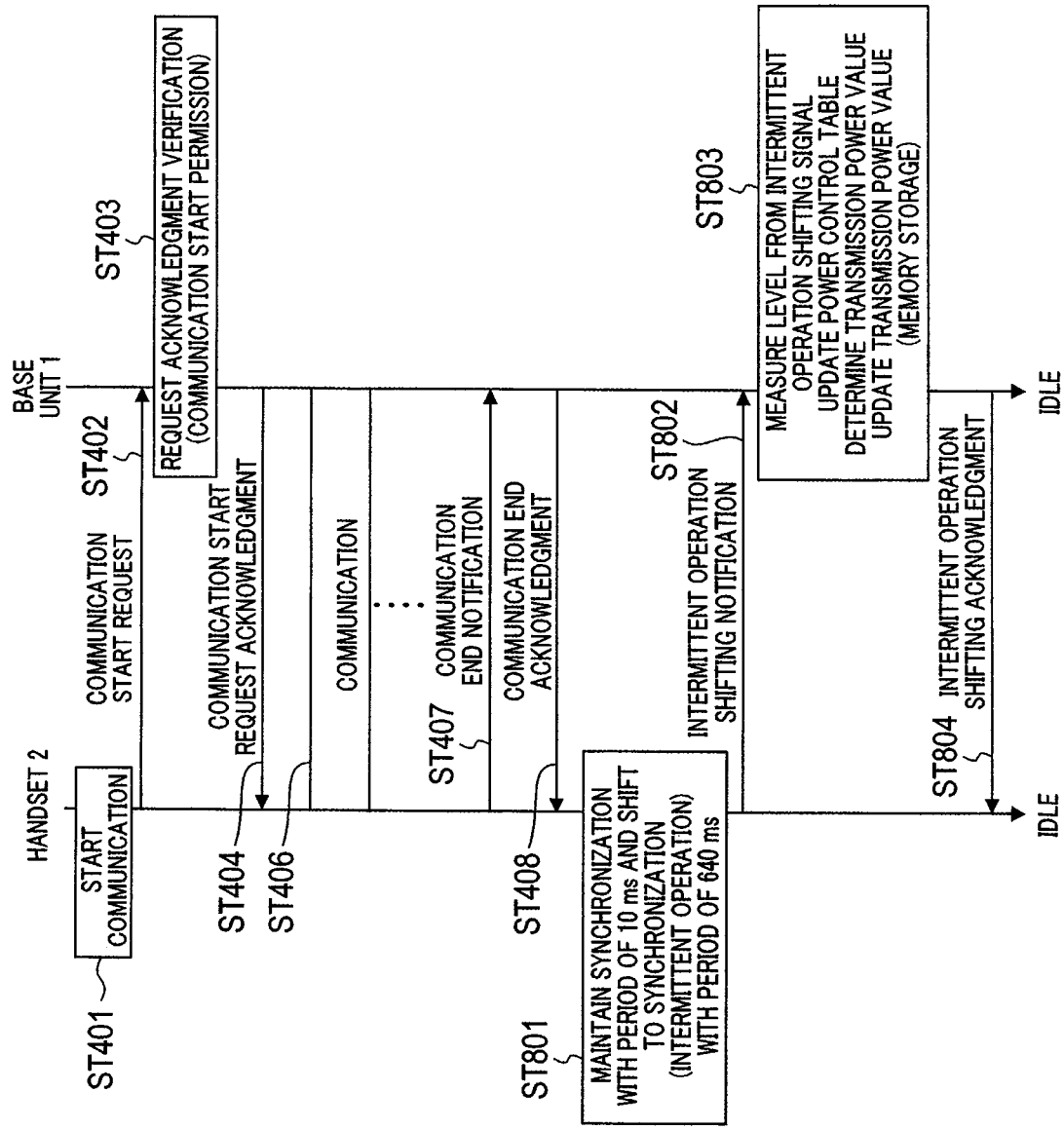
FIG. 24 is a sequence diagram between a base unit and a handset, showing the transmission power determining procedure at the start of intermittent operation.

The procedure for determining the transmission power at the start of intermittent operation in Embodiment 6 of the present invention will be described using FIG. 24. In FIG. 24, parts that are the same as ones shown in FIG. 8 are assigned the same reference signs, and differences from FIG. 8 will be described.

In FIG. 24, at ST801, handset 2 maintains synchronization with a period of 10 ms and shifts to intermittent operation with a period of 640 ms.

At ST802, handset 2 notifies base unit 1 of shifting to intermittent operation. At ST803, base unit 1 measures the RSSI level of the intermittent operation shifting signal notified to base unit 1 by handset 2, and updates the power control table with the measured RSSI level. Base unit 1 determines the transmission power value for transmitting the control signal to suit the handset having the weakest received signal level, based on the updated power control table, updates the transmission power value stored in memory section 103, and starts transmission power control. In this case, the determination of the transmission power value may be made after transmission of the position registration completion acknowledgement at ST607.

At ST804, base unit 1 transmits to handset 2 an intermittent operation shifting acknowledgment.

Figure 25:
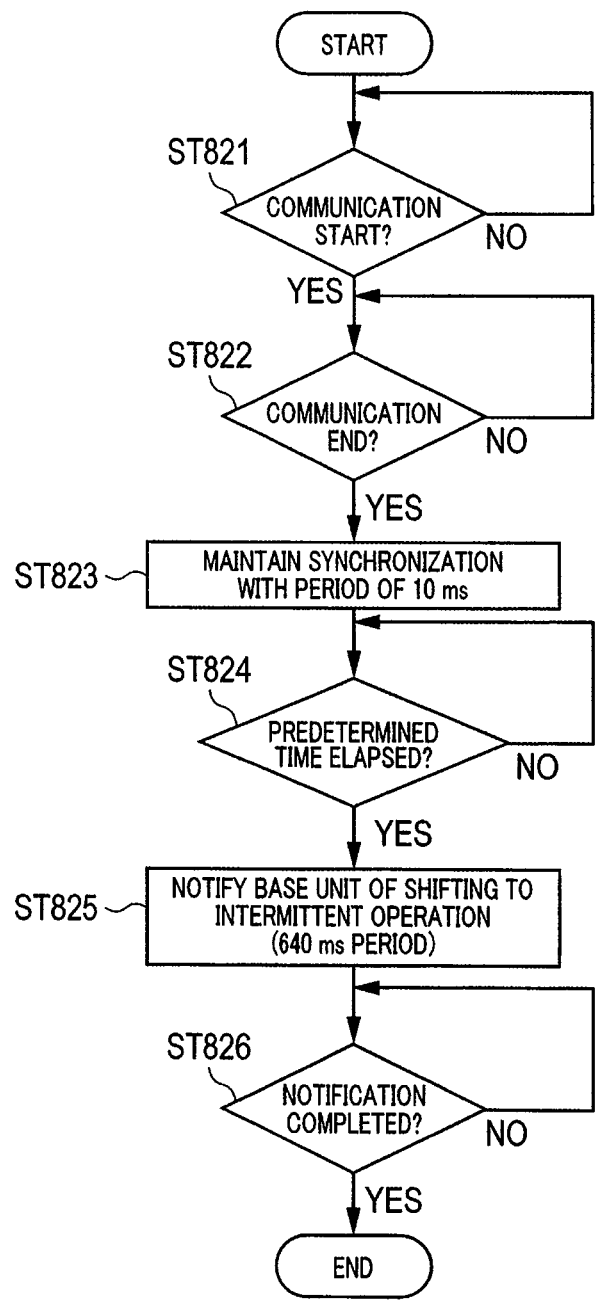
FIG. 25 is a flowchart showing the operation of the handset shown in FIG. 24.

Next, the operation of handset 2 shown in FIG. 24 will be described using FIG. 25. In FIG. 25, at ST821, handset 2 judges whether or not communication is to start with base unit 1. If communication is to start (YES at ST821), the flow goes to ST822, and if communication is not to start (NO at ST821), the flow returns to ST821.

At ST822, handset 2 judges whether or not communication with base unit 1 is to end. If communication is to end (YES at ST822), the flow goes to ST823, and if communication is not to end (NO at ST822), the flow returns to ST822.

At ST823, handset 2 maintains synchronization with base unit 1 with a period of 10 ms. At ST824, handset 2 judges whether or not a predetermined time has elapsed. If the predetermined time has elapsed (YES at ST824), the flow goes to ST825, and if the predetermined time has not elapsed (NO at ST824), the flow returns to ST824.

At ST825, handset 2 notifies base unit 1 of shifting to intermittent operation with a period of 640 ms. At ST826, handset 2 judges whether or not the intermittent operation shifting notification has been completed. If it has been completed (YES at ST826), the flow ends, and if it has not been completed (NO at ST826), the flow returns to ST825.

In this manner, base unit 1 measures the RSSI level of the intermittent operation shifting notification signal transmitted from handset 2, determines the transmission power value based on the power control table updated with the measured RSSI level, and performs transmission power control. In the case of performing radio communication with one or a plurality of handsets, this enables maintenance of communication with handsets while avoiding an increase in radio interference to another radio communication system as much as possible.

Figure 26:
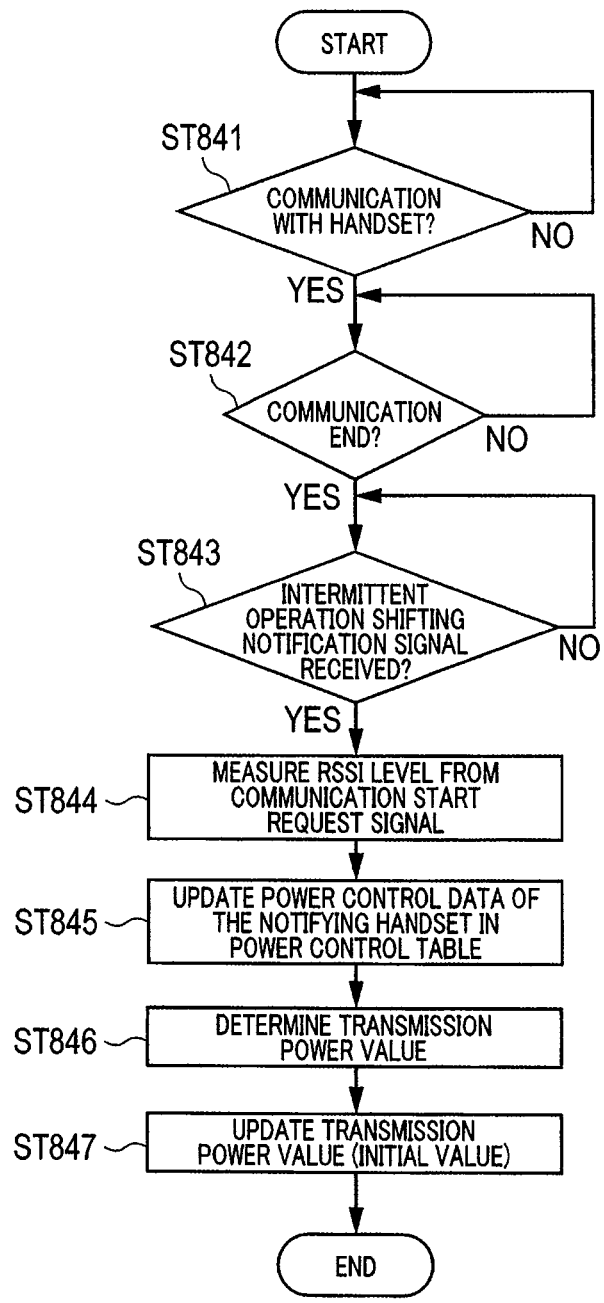
FIG. 26 is a flowchart showing the operation of the base unit shown in FIG. 24.

Next, the operation of base unit 1 shown in FIG. 24 will be described using FIG. 26. In FIG. 26, at ST841, base unit 1 judges whether or not base unit 1 is in communication with handset 2. If base unit 1 is in communication (YES at ST841), the flow goes to ST842, and if base unit 1 is not in communication (NO at ST841), the flow returns to ST841.

At ST842, base unit 1 judges whether or not communication with handset 2 has ended. If communication has ended (YES at ST842), the flow goes to ST843, and if communication has not ended (NO at ST842), the flow returns to ST842.

At ST843, base unit 1 judges whether or not the intermittent operation shifting notification signal has been received handset 2. If it has been received (YES at ST843), the flow goes to ST844, and if it has not be received (NO at ST843), the flow returns to ST843.

At ST844, base unit 1 measures the RSSI level of the intermittent operation shifting notification signal transmitted from handset 2. At ST845, base unit 1 updates the RSSI level of handset 2 in the power control table that is communicating.

At ST846, base unit 1 determines the transmission power value. At ST847, base unit 1 updates the initial value of the transmission power value, starts transmission power control, and ends the procedure for determining the transmission power at the base unit side at the start of intermittent operation.

In this manner, according to Embodiment 6, base unit 1 measures the RSSI level of the intermittent operation shifting notification signal transmitted from handset 2, determines the transmission power value based on the minimum RSSI level in the power control table updated by the measured RSSI level, and performs transmission power control. In the case of performing radio communication with one or a plurality of handsets, this enables maintenance of communication with handsets while avoiding an increase in radio interference to another radio communication system as much as possible.

Although in the above-described embodiments the description has been for the case in which the RSSI level of a received signal is stored in memory section 103, this is not a restriction on the present invention, and another value, such as a propagation path loss may be calculated and stored beforehand.

(Embodiment 7)

Next, an embodiment for the case in which the conditions for shifting to the state of performing transmission power control and the conditions for canceling transmission power control are made different will be described. Because transmission power control of the control signal in the case of a plurality of handsets existing is done in accordance with a handset at a distant position, the possibility of the control signal not reaching the handset at the distant position is made small, and communication with all handsets is maintained while avoiding an increase in radio interference to another radio communication system as much as possible.

Upon receiving a removal notification signal from any handset 2, signal processing section 102 of base unit 1 removes the values of the RSSI level ($Ppp_i$) and the placement notification signal receiving time ($Tpp_i$) from the list in memory section 103 regarding handset 2. As an example, FIG. 27 shows a situation where a removal notification signal has been received from handset 2 having the ID number of ID3 and the values of the RSSI level ($Ppp_i$) and the placement notification signal receiving time ($Tpp_i$) regarding that handset 2 have been removed.

When a removal notification signal is received from any handset 2 as noted above, and the RSSI level ($Ppp_i$) of memory section 103 is deleted, transmission power control section 102a cancels the transmission power control and controls amplification section 104b so that a radio signal is always transmitted with the maximum power.

When an RSSI level ($Ppp_i$) other than the minimum value in memory section 103 is deleted, transmission power control section 102a can select, instead of immediately canceling the transmission power control, either maintaining or canceling of transmission power control in accordance with the RSSI level of a voice signal subsequently transmitted from handset 2. That is, if a removal notification signal is transmitted from handset 2 that has an RSSI level ($Ppp_i$) other than the minimum level, transmission power control section 102a maintains transmission power control at that point.

After that, when a signal (signal carrying voice data related to a call or other notification signal) is transmitted from that handset 2, transmission power control section 102a of base unit 1 compares the RSSI level of the signal at that time with a received power reference value. If the RSSI level of the voice signal or the like from that handset 2 (handset 2 having an RSSI level other than the minimum value at the time the removal notification signal was transmitted) decreases to no greater than a predetermined received power reference value, transmission power control section 102a cancels transmission power control, but maintains transmission power control if the level exceeds the received power reference value.

Figure 28:
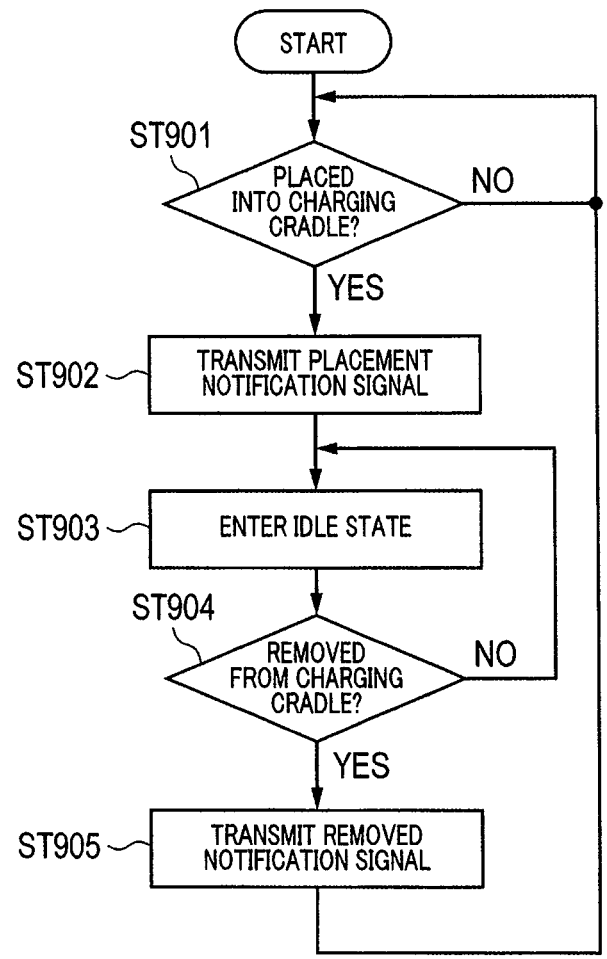
FIG. 28 is a flowchart showing the operation of a handset according to an embodiment of the present invention.

Next, the operation of handset 2 according to the present embodiment will be described using the flow shown in FIG. 28.

When the user is to place handset 2 in the usable state, the power of handset 2 is first turned on and handset 2 is placed into charging cradle 3 (ST901).

When handset 2 is placed into charging cradle 3 (YES at ST901), handset 2 transmits a placement notification signal to base unit 1, and goes into the idle state (ST902, ST903).

After that, consider the case in which the user removes handset 2 from charging cradle 3, for example, to use handset 2 for a call (YES at ST904). In this case, handset 2 transmits a removal notification signal to base unit 1 (ST905). The flow then returns to ST901.

Figure 29:
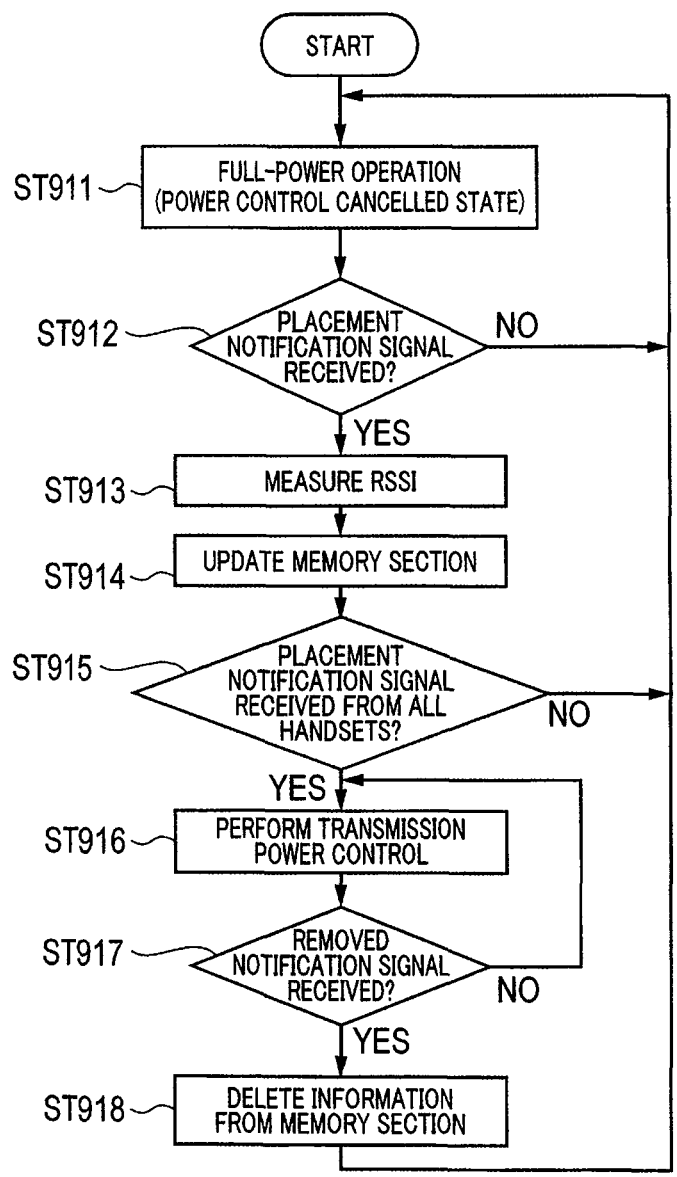
FIG. 29 is a flowchart showing the operation of a base unit according to an embodiment of the present invention.

Next, the operation of the base unit according to the present embodiment will be described using the flow shown in FIG. 29.

With the default being that base unit 1 does not perform transmission power control and operates at full power, base unit 1 transmits a radio signal at all times with the maximum power (ST911).

After that, base unit 1 monitors whether or not a placement notification signal is received from handset 2 (ST912). Upon receiving the placement notification signal from handset 2 (YES at ST912), base unit 1 measures the RSSI and updates the information in memory section 103 (ST913, ST914). Specifically, as shown in FIG. 6, the RSSI level of a notification signal such as the placement notification signal transmitted from handset 2 and the time of reception of the signal are stored in association with the ID number of handset 2 into memory section 103.

At ST915, base unit 1 checks to see whether or not the RSSI levels of the placement notification signals (or other notification signal) and the reception times of the signals regarding all handsets 2 registered in memory section 103 are present. Base unit 1 repeats the processing of ST911 to ST914 until the RSSI levels of the signals from all handsets 2 and the reception times of the signals are present (NO at ST915).

When placement notification signals are received from all handsets 2 and the RSSI levels and the reception times of signals from all handsets 2 are present in memory section 103 (YES at ST915), base unit 1 performs transmission power control (ST916).

After that, upon receiving a removal notification signal from any handset 2 (YES at ST917), base unit 1 deletes information regarding that handset 2 (RSSI level and reception time) from memory section 103 (ST918), cancels transmission power control, and goes into full-power operation (returns to ST911).

In the above example, base unit 1 performs transmission power control only in the case in which all handsets 2 are placed in charging cradles 3 or the charging part of base unit 1 and transmits the control signal with full power in the case in which any handset 2 is removed, so that even if a certain handset 2 is moved to a distance away from charging cradle 3, there is little possibility of losing synchronization with the handset 2.

Figure 30:
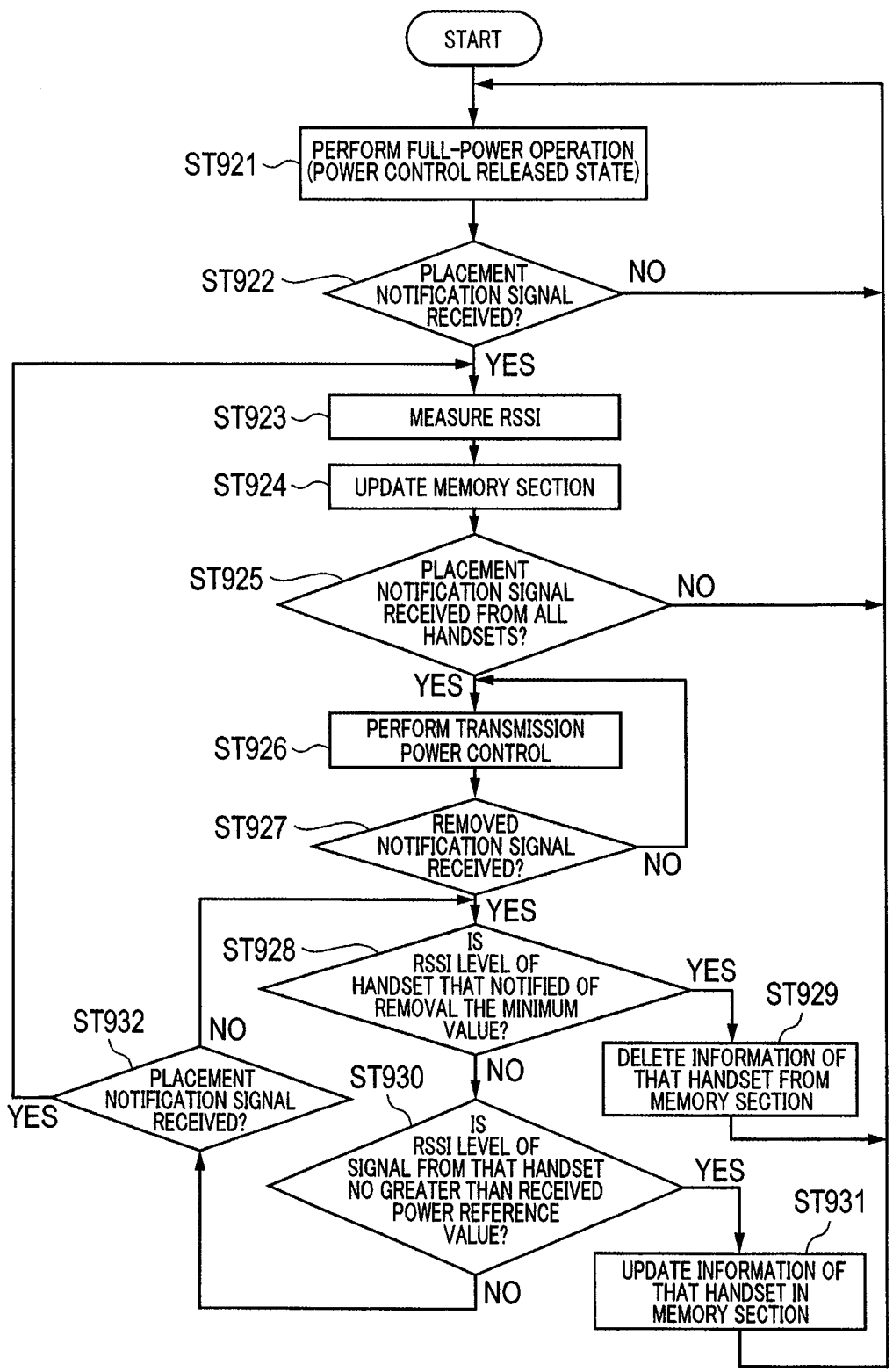
FIG. 30 is a flowchart showing the operation of a base unit according to another embodiment of the present invention.

Next, the operation of a base unit according to another embodiment of the present invention will be described using the flow shown in FIG. 30.

Base unit 1 operates with full power and transmits a radio signal at all times with the maximum power without performing transmission power control at the default setting (ST921).

After that, base unit 1 monitors whether or not a placement notification signal is received from handset 2 (ST912). Upon receiving the placement notification signal from handset 2 (YES at ST922), base unit 1 measures the RSSI and updates the information in memory section 103 (ST923, ST924). Specifically, as shown in FIG. 6, the RSSI level of a notification signal such as the placement notification signal transmitted from handset 2 and the time of reception of the signal are stored in association with the ID number of handset 2 into memory section 103.

At ST925, base unit 1 checks to see whether or not the RSSI levels of the placement notification signals (or other notification signal) and the reception times of the signals regarding all handsets 2 registered in memory section 103 are present. Base unit 1 repeats the processing of ST921 to ST924 until the RSSI signal levels of all handsets 2 and the reception times of the signals are present (NO at ST925). ST925 is processing to check placement of all handsets to judge whether or not all handsets 2 have been placed into charging cradles 3.

When placement notification signals are received from all handsets 2 and the RSSI levels and the reception times of the signals from all handsets 2 are present in memory section 103 (YES at ST925), transmission power control is performed (ST926). If the RSSI levels and the reception times of the signals regarding all handsets 2 are not present (NO at ST925), full-power operation is maintained (and the flow returns to ST921).

After that, upon receiving a removal notification signal from any handset 2 (YES at ST927), base unit 1 checks whether or not the RSSI level of handset 2 that had given notification by a removal notification signal is the minimum value stored in memory section 103 (ST928). If the RSSI level of the handset 2 that had given notification by a removal notification signal is the minimum value (YES at ST928), base unit 1 deletes information (RSSI level and reception time) of that handset 2 from memory section 103 (ST929). Base unit 1 then cancels transmission power control and operates at full power (returns to ST921). ST928 is processing to judge the reception level in order to cancel transmission power control in accordance with the reception level for the case in which one handset has been removed from a charging cradle.

At ST928, in the case in which the RSSI level of the handset that had given notification by the removal notification signal was not the minimum value (NO at ST928), base unit 1 measures the RSSI of a signal (voice signal or the like) subsequently transmitted from that handset 2 and checks whether or not the RSSI level of that handset 2 is no greater than a received power reference value (ST930). If the RSSI level of that handset 2 is no greater than the received power reference value (YES at ST930), base unit 1 measures the RSSI of a signal from that handset 2 and updates information in memory section 103 (ST931). Having done this, base unit 1 cancels transmission power control and operates at full power (returns to ST921).

If, however, the RSSI level of that handset 2 was greater than the received power reference value (NO at ST930), base unit 1 monitors whether or not a placement notification signal has been received from handset 2 (ST932). If a placement notification signal has not been received from handset 2 (NO at ST932), base unit 1 repeats the processing of ST928, ST930, and ST932, while continuing the transmission power control.

If a placement notification signal is received from that handset 2 (YES at ST931) before the RSSI level of the received signal of that handset 2 becomes the minimum value or is no greater than the received power reference value (NO at ST928 and NO at ST932), base unit 1 measures the RSSI of that placement notification signal and updates information in memory section 103 (ST923, ST924). When doing this, if the RSSI levels and reception times for signals regarding all handsets 2 are not present (NO at ST925), base unit 1 cancels transmission power control and operates at full power (returns to ST921).

As described above, according to the present embodiment, even when one handset is removed from a charging cradle, transmission power control is cancelled in accordance with the reception level of a signal transmitted from that handset. Thus, even if that handset moves away from the base unit, it is possible to allow the handset to receive a control signal at a stronger level, thereby maintaining communication with the handset.

According to the present embodiment, transmission power control is cancelled when a handset having the minimum received signal level is removed from the charging cradle or when the received signal level of a handset removed from a charging cradle is no greater than a received power reference level value of the received signal level. This enables maintenance of communication with all handsets, while avoiding an increase in radio interference to another radio communication system as much as possible.

Although in the present embodiment the description has been provided with regard to the case in which the RSSI level of a received control signal is stored in memory section 103, this is not a restriction on the present invention, and another value, such as a propagation path loss may be calculated and stored beforehand, for example.

REFERENCE SIGNS LIST

1 Base unit
2 Handset
3 Charging cradle
101 Telephone line interface
102, 201 Signal processing section
102a Transmission power control section
103, 202 Memory section
104, 203 Radio section
104a Level measurement section
104b Amplification section
105, 204 Antenna
211 Charging circuit
212 Secondary battery
213 Voltage regulation circuit
301 External power supply connector
302 Power supply circuit

The invention claimed is:

1. A radio communication base unit apparatus comprising:
   a radio controller configured to measure reception levels of signals received from a plurality of handsets;
   a memory configured to store the reception levels of the plurality of handsets, respectively;
   a signal processor configured to determine a transmission power value, at which to transmit a control signal to all of the plurality of handsets, based on a minimum value of the stored reception levels of the plurality of handsets; and
   a transmitter configured to transmit the control signal at the determined transmission power value to all of the plurality of handsets.

2. The radio communication base unit apparatus according to claim 1, which is configured to perform radio communication with the plurality of handsets in a time division multiple access (TDMA) system; wherein
   the transmitter is configured to transmit the control signal using a control channel that is set in the TDMA system.

3. The radio communication base unit apparatus according to claim 1, wherein:
   the memory is configured to store IDs of the plurality of handsets in association with their reception levels, respectively, and
   the signal processor is configured to determine the transmission power value at a timing at which information stored in the memory is updated.

4. The radio communication base unit apparatus according to claim 1, wherein the radio controller is configured to measure the reception level of a communication start request signal indicating a request to start communication or a communication end request signal indicating a request to end communication.

5. The radio communication base unit apparatus according to claim 1, wherein the radio controller is configured to measure the reception level of any one of a handset registration start request signal indicating a request to start registration of the handset, a handset registration completion notification signal indicating notification of completion of registration of the handset, and a handset registration information notification signal indicating notification of registration information of the handset.

6. The radio communication base unit apparatus according to claim 1, wherein the radio controller is configured to measure the reception level of a position registration request signal indicating a request for registration of a position of the handset or a position registration completion notification signal indicating notification of completion of registration of the position of the handset.

7. The radio communication base unit apparatus according to claim 1, wherein the radio controller is configured to measure the reception level of a placement notification signal indicating that the handset is placed into a charging cradle.

8. The radio communication base unit apparatus according to claim 1, wherein the radio controller is configured to measure the reception level of an intermittent operation shifting notification signal indicating notification of shifting to intermittent operation.

9. The radio communication base unit apparatus according to claim 1, wherein the signal processor is configured to determine the transmission power value based on the minimum value of the stored reception levels when all of the plurality of handsets registered in the memory are placed in charging cradles, respectively.

10. The radio communication base unit apparatus according to claim 9, wherein the signal processor is configured to abort determination of the transmission power value when one of the plurality of handsets is removed from the charging cradle while the transmission power value is being determined.

11. The radio communication base unit apparatus according to claim 9, wherein the signal processor is configured to abort determination of the transmission power value when a handset having the reception level other than the minimum value is removed from the charging cradle and the reception level of a signal subsequently received from said handset does not exceed a power reference value.

12. The radio communication base unit apparatus according to claim 9, wherein the signal processor is configured to detect that a handset is placed into a charging cradle by receiving a placement notification signal from the handset, and to perform all handset placement judgment processing to determine whether or not all of the plurality of handsets are placed in the charging cradles, respectively.

13. The radio communication base unit apparatus according to claim 9, wherein, when at least one of the plurality of handsets is removed from the charging cradle while the transmission power value is being determined, the signal processor performs reception level judgment processing to determine whether or not the reception level of the handset removed from the charging cradle is the minimum value, and aborts determination of the transmission power value when the reception level of the handset is the minimum value.

14. The radio communication base unit apparatus according to claim 13, wherein the signal processor determines, in the reception level judgment processing, to abort determination of the transmission power value when the reception level of the handset removed from the charging cradle is not the minimum value but the reception level of a signal subsequently received from said handset does not exceed a power reference value.

15. A transmission power control method comprising:
measuring reception levels of signals received from a plurality of handsets;
storing the reception levels of the plurality of handsets, respectively;
determining a transmission power value, at which to transmit a control signal, in accordance with a minimum value of the stored reception levels of the plurality of handsets; and
transmitting the control signal at the determined transmission power value to all the plurality of handsets.

16. The transmission power control method according to claim 15, wherein the signals received from the plurality of handsets include a communication start request signal indicating a request to start communication or a communication end request signal indicating a request to end communication.

17. The transmission power control method according to claim 15, wherein the signals received from the plurality of handsets include a handset registration request signal indicating a request for registration of the handset.

18. The transmission power control method according to claim 15, wherein the signals received from the plurality of handsets include a position registration request signal indicating a request for registration of a position of the handset.

19. The transmission power control method according to claim 15, wherein the signals received from the plurality of handsets include a placement notification signal indicating notification that the handset is placed into a charging cradle.

20. The transmission power control method according to claim 15, further comprising performing radio communication with the plurality of handsets in a time division multiple access (TDMA) system, wherein
the control signal is transmitted using a control channel that is set in the TDMA system.

21. The transmission power control method according to claim 15, wherein the signals received from the plurality of handsets include an intermittent operation shifting notification signal indicating that the handset has shifted to intermittent operation.

* * * * *